(12) United States Patent
Hsu et al.

(10) Patent No.: US 9,841,583 B2
(45) Date of Patent: Dec. 12, 2017

(54) OPTICAL IMAGING LENS AND ELECTRONIC DEVICE COMPRISING THE SAME

(71) Applicant: Genius Electronic Optical Co., Ltd., Taichung (TW)

(72) Inventors: Sheng-Wei Hsu, Taichung (TW); Pei-Chi Wang, Taichung (TW)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 0 days.

(21) Appl. No.: 15/181,420

(22) Filed: Jun. 14, 2016

(65) Prior Publication Data

US 2017/0315333 A1 Nov. 2, 2017

(30) Foreign Application Priority Data

Apr. 29, 2016 (CN) .......................... 2016 1 0278223

(51) Int. Cl.
*G02B 13/18* (2006.01)
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC ....... G02B 13/0045; G02B 9/62; G02B 13/04
USPC ................................ 359/713, 752, 756, 757
See application file for complete search history.

(56) References Cited

U.S. PATENT DOCUMENTS

2015/0316749 A1* 11/2015 Chen .................. G02B 13/0045
348/340

FOREIGN PATENT DOCUMENTS

| TW | M471592 | 2/2014 |
| TW | I448725 | 8/2014 |
| TW | I500959 | 9/2015 |

OTHER PUBLICATIONS

Huang, Title of Invention: Optical Imaging System for Pickup, U.S. Appl. No. 14/136,115, filed Dec. 20, 2013.
Hsu et al., Title of Invention: Photographing Lens Assembly, U.S. Appl. No. 13/849,556, filed Mar. 25, 2013.

* cited by examiner

*Primary Examiner* — William Choi
(74) *Attorney, Agent, or Firm* — Winston Hsu

(57) ABSTRACT

An optical imaging lens set includes a first lens element with an image-side surface of a concave part in a vicinity of the optical axis, a second lens element with an object-side surface of a concave part in a periphery region, with an image-side surface of a concave part in a vicinity of the optical axis and of a concave part in a periphery region, a third lens element with an object-side surface of a concave part in a periphery region, a fourth lens element of positive refractive power with an object-side surface of a concave part of the optical axis, a third lens element thickness $T_3$, an air gap $G_{34}$ between the third lens element and the fourth lens element and an air gap $G_{45}$ between the fourth lens element and the fifth lens element to satisfy $(T_3+G_{45})/G_{34} \leq 1.20$.

20 Claims, 32 Drawing Sheets

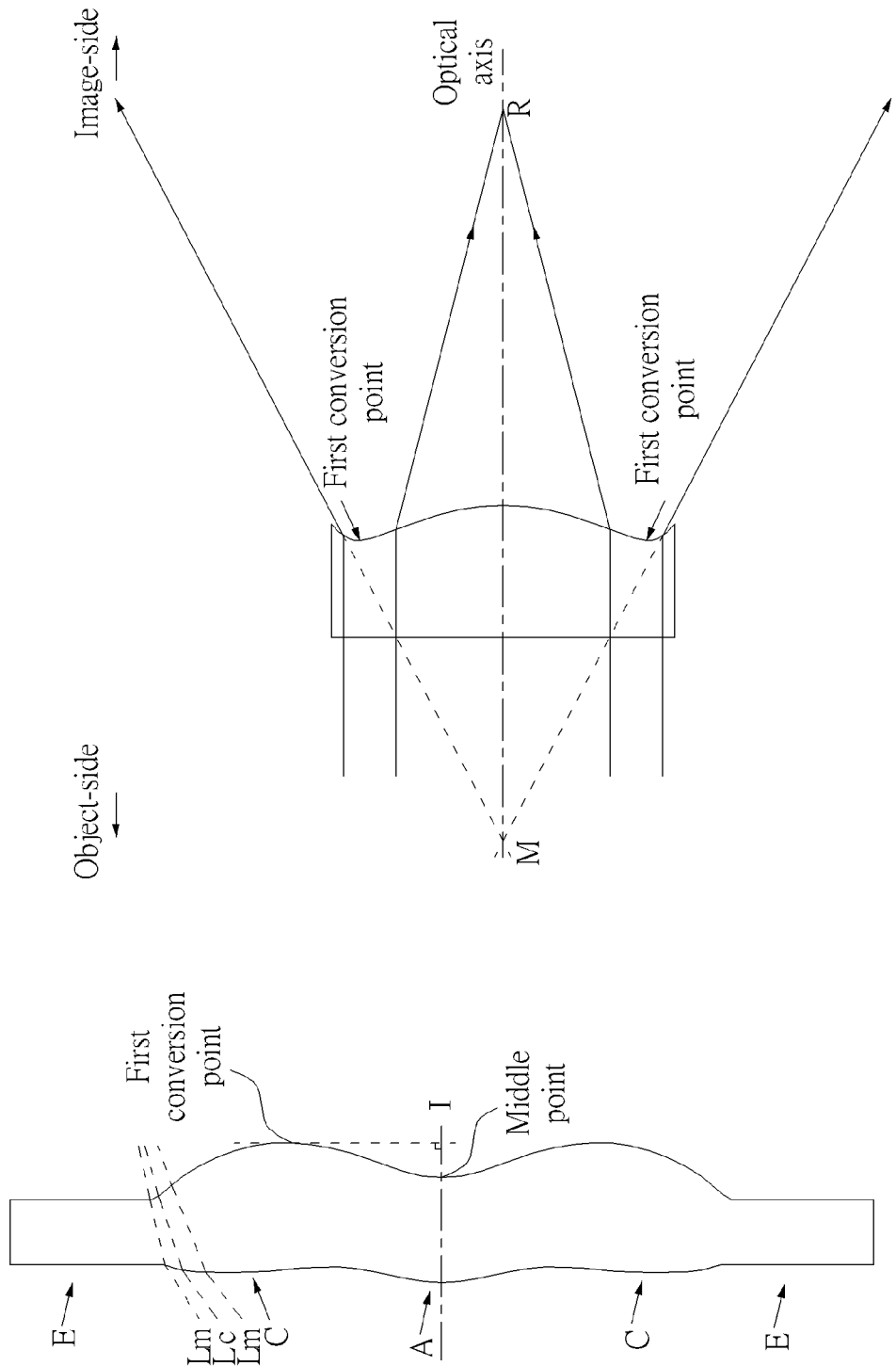

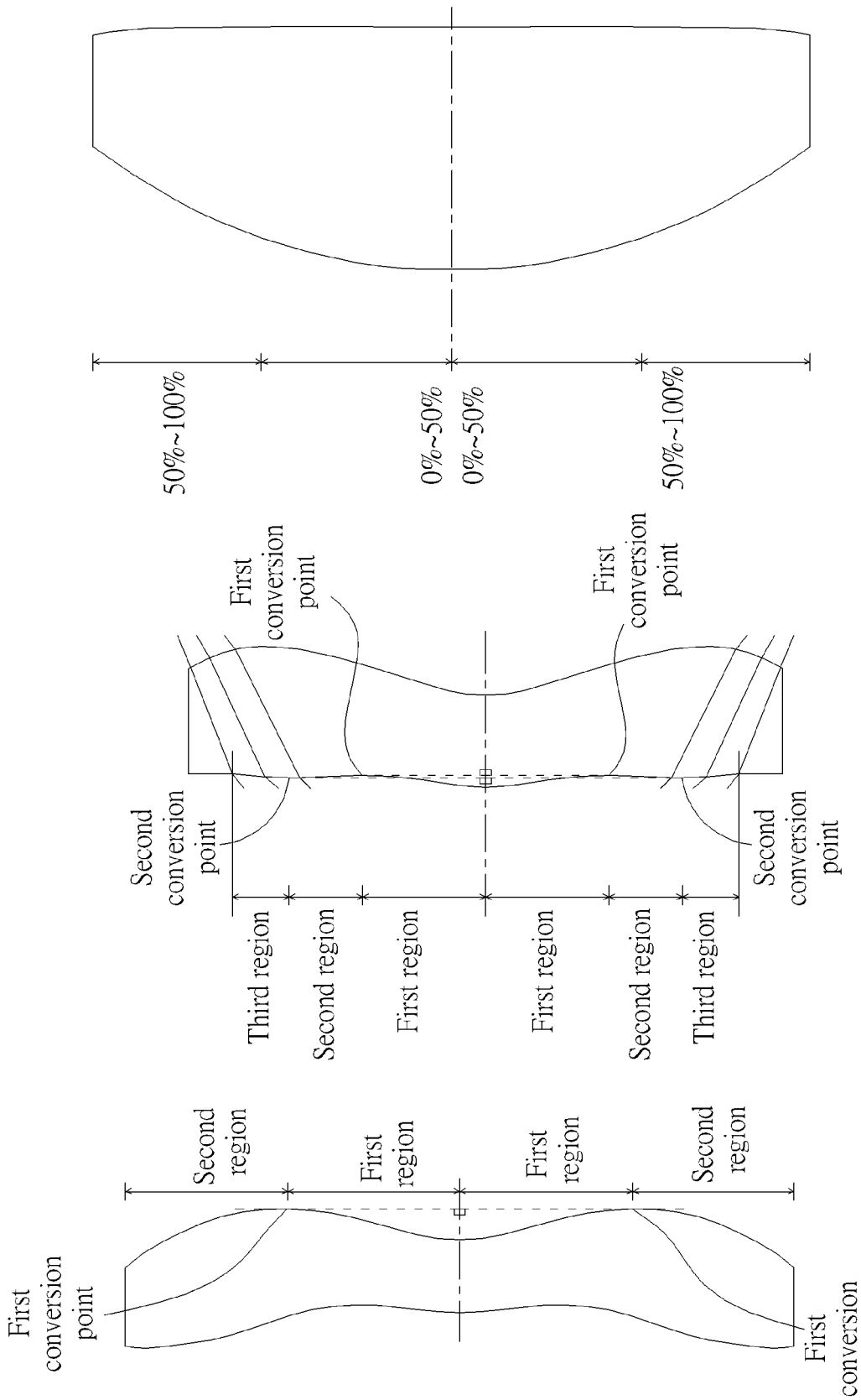

| First Example |||||||
|---|---|---|---|---|---|---|
| EFL= 3.4469 mm, HFOV= 40.3902 deg., Fno= 2.0920 |||||||
| No. | | Curvature Radius | Ape. Stop Distance Lens Thickness Air Gap | | Refractive Index | Abbe No. | Focal Length |
| | Object | 1.00E+18 | 10000 | | | | |
| 80 | Ape. Stop | 1.00E+18 | -0.2657 | | | | |
| 11 | First Lens | 1.4240 | 0.5058 | $T_1$ | 1.5459 | 56.1138 | 3.1272 |
| 12 | | 7.5066 | 0.0948 | $G_{12}$ | | | |
| 21 | Second Lens | 12.6630 | 0.2506 | $T_2$ | 1.6479 | 22.3972 | -6.1911 |
| 22 | | 3.0226 | 0.2673 | $G_{23}$ | | | |
| 31 | Third Lens | 5.1749 | 0.4172 | $T_3$ | 1.5459 | 56.1138 | 9.8078 |
| 32 | | 150.0000 | 0.4113 | $G_{34}$ | | | |
| 41 | Fourth Lens | -2.0412 | 0.3860 | $T_4$ | 1.5459 | 56.1138 | 4.0379 |
| 42 | | -1.1306 | 0.0691 | $G_{45}$ | | | |
| 51 | Fifth Lens | 20.1372 | 0.3642 | $T_5$ | 1.6479 | 22.3972 | -104.4821 |
| 52 | | 15.4099 | 0.1997 | $G_{56}$ | | | |
| 61 | Sixth Lens | 14.2779 | 0.3708 | $T_6$ | 1.5459 | 56.1138 | -2.8727 |
| 62 | | 1.4001 | 0.5000 | | | | |
| 70 | IR Filter | 1.00E+18 | 0.2100 | | 1.5183 | 64.1664 | |
| | IR Filter-Image Plane | 1.00E+18 | 0.2046 | | | | |
| 71 | Image Plane | 1.00E+18 | 0.0041 | | | | |

FIG. 26

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 3.493652E-03 | -9.249007E-02 | -1.986339E-01 | -1.265351E-01 | -1.200141E-01 | -6.258151E-02 |
| a6 | 1.100013E-02 | 1.305911E-01 | 3.949199E-01 | 2.381476E-01 | -1.084754E-01 | -1.088848E-02 |
| a8 | 3.772579E-02 | 9.073485E-02 | -3.328444E-01 | 2.733373E-01 | 3.299090E-01 | -3.462319E-01 |
| a10 | -1.500511E-01 | -6.037454E-01 | -3.882505E-02 | -1.748391E+00 | -7.162865E-01 | 9.187902E-01 |
| a12 | 2.753584E-01 | 8.458549E-01 | 1.943914E-01 | 3.484389E+00 | 7.331556E-01 | -1.447667E+00 |
| a14 | -1.777448E-01 | -5.391531E-01 | -1.665689E-01 | -3.420287E+00 | -2.171963E-01 | 1.380821E+00 |
| a16 | 0.000000E+00 | 0.000000E+00 | 0.000000E+00 | 1.424194E+00 | 0.000000E+00 | -6.840181E-01 |
| a18 | 0.000000E+00 | 0.000000E+00 | 0.000000E+00 | 0.000000E+00 | 0.000000E+00 | 1.530438E-01 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -9.934152E-01 | -1.522941E-01 | 0.000000E+00 | 0.000000E+00 | -9.889162E-01 |
| a4 | 7.742476E-02 | 8.819913E-02 | 3.317467E-01 | -8.376363E-02 | -1.761566E-01 | -3.466776E-01 |
| a6 | -9.822453E-02 | -4.182423E-02 | -5.817333E-01 | 1.179766E-01 | 7.497221E-03 | 2.428949E-01 |
| a8 | 2.558834E-01 | 4.605091E-01 | 5.179369E-01 | -2.139796E-01 | 7.545902E-02 | -1.446696E-01 |
| a10 | -5.345848E-01 | -1.435559E+00 | -2.403855E-01 | 1.908273E-01 | -5.163581E-02 | 6.772445E-02 |
| a12 | 5.679772E-01 | 2.267578E+00 | 5.046265E-02 | -9.169241E-02 | 1.773681E-02 | -2.317168E-02 |
| a14 | -2.883237E-01 | -1.962167E+00 | -1.460605E-03 | 2.428327E-02 | -3.631712E-03 | 5.386997E-03 |
| a16 | 5.632472E-02 | 9.464533E-01 | -6.403197E-04 | -3.309073E-03 | 4.466636E-04 | -7.918321E-04 |
| a18 | 0.000000E+00 | -2.401863E-01 | 0.000000E+00 | 1.797181E-04 | -3.021549E-05 | 6.578685E-05 |
| a20 | 0.000000E+00 | 2.506617E-02 | 0.000000E+00 | 0.000000E+00 | 8.462734E-07 | -2.340666E-06 |

FIG. 27

| Second Example | | | | | | |
|---|---|---|---|---|---|---|
| EFL= 3.5492 mm, HFOV= 39.5648 deg., Fno= 2.0920 | | | | | | |
| No. | | Curvature Radius | Ape. Stop Distance Lens Thickness Air Gap | | Refractive Index | Abbe No. | Focal Length |
| | Object | 1.00E+18 | 10000 | | | | |
| 80 | Ape. Stop | 1.00E+18 | -0.2799 | | | | |
| 11 | First Lens | 1.4399 | 0.5650 | $T_1$ | 1.5459 | 56.1138 | 3.1754 |
| 12 | | 7.3212 | 0.1013 | $G_{12}$ | | | |
| 21 | Second Lens | 12.8856 | 0.2668 | $T_2$ | 1.6479 | 22.3972 | -6.5049 |
| 22 | | 3.1500 | 0.2864 | $G_{23}$ | | | |
| 31 | Third Lens | 4.8954 | 0.3150 | $T_3$ | 1.5459 | 56.1138 | 10.2003 |
| 32 | | 39.5742 | 0.4313 | $G_{34}$ | | | |
| 41 | Fourth Lens | -2.0193 | 0.4313 | $T_4$ | 1.5459 | 56.1138 | 3.9283 |
| 42 | | -1.1185 | 0.0300 | $G_{45}$ | | | |
| 51 | Fifth Lens | 45.5379 | 0.3788 | $T_5$ | 1.6479 | 22.3972 | -52.1794 |
| 52 | | 19.3392 | 0.1696 | $G_{56}$ | | | |
| 61 | Sixth Lens | 16.9242 | 0.4280 | $T_6$ | 1.5459 | 56.1138 | -2.9157 |
| 62 | | 1.4419 | 0.5000 | | | | |
| 70 | IR Filter | 1.00E+18 | 0.2100 | | | | |
| | IR Filter-Image Plane | 1.00E+18 | 0.2344 | | | | |
| 71 | Image Plane | 1.00E+18 | 0.0049 | | | | |

FIG. 28

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 2.350613E-03 | -8.658358E-02 | -1.834188E-01 | -1.112948E-01 | -1.113229E-01 | -5.166968E-02 |
| a6 | 2.220115E-02 | 1.238322E-01 | 3.265651E-01 | 1.852663E-01 | -1.541356E-01 | -1.010711E-01 |
| a8 | -3.227347E-02 | -1.703820E-02 | -2.808818E-01 | 3.601923E-01 | 4.223199E-01 | -1.471108E-02 |
| a10 | 3.458950E-02 | -2.273853E-01 | 9.239956E-02 | -1.742287E+00 | -8.280708E-01 | 1.390308E-01 |
| a12 | 2.574820E-02 | 3.310269E-01 | -7.595462E-02 | 3.296947E+00 | 8.258860E-01 | -2.517184E-01 |
| a14 | -4.212621E-02 | -2.557443E-01 | -1.824120E-02 | -3.174163E+00 | -2.612299E-01 | 2.330560E-01 |
| a16 | 0.000000E+00 | 0.000000E+00 | 0.000000E+00 | 1.283048E+00 | 0.000000E+00 | -5.520726E-02 |
| a18 | 0.000000E+00 | 0.000000E+00 | 0.000000E+00 | 0.000000E+00 | 0.000000E+00 | 4.881365E-03 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -9.807787E-01 | 0.000000E+00 | 0.000000E+00 | 0.000000E+00 | -9.998359E-01 |
| a4 | 9.110722E-02 | 9.367092E-02 | -1.459353E-01 | -1.040102E+00 | -4.292096E+00 | -3.344784E-01 |
| a6 | -1.845704E-01 | -9.175236E-02 | 3.032683E-01 | 4.103940E+00 | -1.181744E+00 | 2.314522E-01 |
| a8 | 4.705345E-01 | 5.117071E-01 | -4.954755E-01 | -2.516217E+01 | 6.460060E+01 | -1.362232E-01 |
| a10 | -7.469774E-01 | -1.293426E+00 | 4.103016E-01 | 7.557210E+01 | -2.389032E+02 | 6.252053E-02 |
| a12 | 6.583393E-01 | 1.843354E+00 | -1.762959E-01 | -1.201305E+02 | 4.794169E+02 | -2.080615E-02 |
| a14 | -3.019771E-01 | -1.499808E+00 | 3.296856E-02 | 1.025575E+02 | -6.028420E+02 | 4.676689E-03 |
| a16 | 5.613537E-02 | 6.911849E-01 | -2.934937E-05 | -4.295945E+01 | 4.743536E+02 | -6.621290E-04 |
| a18 | 0.000000E+00 | -1.686746E-01 | -5.318064E-04 | 6.505059E+00 | -2.135943E+02 | 5.288012E-05 |
| a20 | 0.000000E+00 | 1.696739E-02 | 0.000000E+00 | 0.000000E+00 | 4.191462E+01 | -1.806976E-06 |

FIG. 29

| Third Example | | | | | | |
|---|---|---|---|---|---|---|
| EFL= 3.5255 mm, HFOV= 39.7540 deg., Fno= 2.0920 | | | | | | |
| No. | | Curvature Radius | Ape. Stop Distance Lens Thickness Air Gap | | Refractive Index | Abbe No. | Focal Length |
| | Object | 1.00E+18 | 10000 | | | | |
| 80 | Ape. Stop | 1.00E+18 | -0.2793 | | | | |
| 11 | First Lens | 1.4292 | 0.5117 | $T_1$ | 1.5459 | 56.1138 | 3.2103 |
| 12 | | 6.7675 | 0.0985 | $G_{12}$ | | | |
| 21 | Second Lens | 10.6847 | 0.2428 | $T_2$ | 1.6479 | 22.3972 | -6.3310 |
| 22 | | 2.9375 | 0.2674 | $G_{23}$ | | | |
| 31 | Third Lens | 5.3119 | 0.3648 | $T_3$ | 1.5459 | 56.1138 | 10.6222 |
| 32 | | 61.7062 | 0.3900 | $G_{34}$ | | | |
| 41 | Fourth Lens | -2.1332 | 0.4405 | $T_4$ | 1.5459 | 56.1138 | 3.9069 |
| 42 | | -1.1443 | 0.0433 | $G_{45}$ | | | |
| 51 | Fifth Lens | 150.0000 | 0.2809 | $T_5$ | 1.6479 | 22.3972 | -86.6400 |
| 52 | | 40.8176 | 0.3900 | $G_{56}$ | | | |
| 61 | Sixth Lens | 17.3821 | 0.3000 | $T_6$ | 1.5459 | 56.1138 | -2.9753 |
| 62 | | 1.4764 | 0.5000 | | | | |
| 70 | IR Filter | 1.00E+18 | 0.2100 | | 1.5183 | 64.1664 | |
| | IR Filter-Image Plane | 1.00E+18 | 0.2410 | | | | |
| 71 | Image Plane | 1.00E+18 | 0.0091 | | | | |

FIG. 30

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 1.271723E-03 | -8.599365E-02 | -1.940860E-01 | -1.206842E-01 | -1.176536E-01 | -5.153045E-02 |
| a6 | 2.883846E-02 | 8.761067E-02 | 3.627435E-01 | 2.225443E-01 | -1.175425E-01 | -8.442060E-02 |
| a8 | -2.290468E-02 | 2.147046E-01 | -2.690051E-01 | 2.961902E-01 | 2.603683E-01 | -1.766214E-01 |
| a10 | -3.840461E-02 | -8.335437E-01 | -1.118228E-01 | -1.706397E+00 | -4.841700E-01 | 7.354890E-01 |
| a12 | 1.653917E-01 | 1.088836E+00 | 2.626429E-01 | 3.348561E+00 | 4.690647E-01 | -1.522172E+00 |
| a14 | -1.285355E-01 | -6.343637E-01 | -2.066088E-01 | -3.290826E+00 | -1.074023E-01 | 1.838612E+00 |
| a16 | 0.000000E+00 | 0.000000E+00 | 0.000000E+00 | 1.365964E+00 | 0.000000E+00 | -1.149154E+00 |
| a18 | 0.000000E+00 | 0.000000E+00 | 0.000000E+00 | 0.000000E+00 | 0.000000E+00 | 3.103902E-01 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -1.001983E+00 | 0.000000E+00 | 0.000000E+00 | 0.000000E+00 | -9.779101E-01 |
| a4 | 6.428760E-02 | 1.155453E-01 | -6.592306E-01 | -9.335817E-01 | -4.317649E+00 | -3.184690E-01 |
| a6 | -3.205414E-02 | -1.269373E-01 | 3.281568E+00 | 3.117768E+00 | 5.373933E-02 | 2.069733E-01 |
| a8 | 5.772985E-02 | 5.788802E-01 | -1.757983E+01 | -2.282515E+01 | 5.424535E+01 | -1.155946E-01 |
| a10 | -1.853403E-01 | -1.551917E+00 | 4.562850E+01 | 8.007868E+01 | -1.953299E+02 | 5.163448E-02 |
| a12 | 2.782546E-01 | 2.397250E+00 | -6.430904E+01 | -1.491964E+02 | 3.693141E+02 | -1.712418E-02 |
| a14 | -1.837600E-01 | -2.090214E+00 | 4.915915E+01 | 1.529848E+02 | -4.289333E+02 | 3.912024E-03 |
| a16 | 4.395663E-02 | 1.023264E+00 | -1.880683E+01 | -8.087716E+01 | 3.066486E+02 | -5.721913E-04 |
| a18 | 0.000000E+00 | -2.639779E-01 | 2.802701E+00 | 1.712592E+01 | -1.236292E+02 | 4.782078E-05 |
| a20 | 0.000000E+00 | 2.800780E-02 | 0.000000E+00 | 0.000000E+00 | 2.141835E+01 | -1.725880E-06 |

FIG. 31

| Fourth Example ||||||
|---|---|---|---|---|---|
| EFL= 3.4645 mm, HFOV= 39.2417 deg., Fno= 2.0920 ||||||
| No. | Curvature Radius | Ape. Stop Distance Lens Thickness Air Gap || Refractive Index | Abbe No. | Focal Length |
| | Object | 1.00E+18 | 10000 | | | |
| 80 | Ape. Stop | 1.00E+18 | -0.2564 | | | |
| 11 | First Lens | 1.4345 | 0.4822 | $T_1$ | 1.5459 | 56.1138 | 3.2398 |
| 12 | | 6.6902 | 0.0998 | $G_{12}$ | | | |
| 21 | Second Lens | 11.5032 | 0.2200 | $T_2$ | 1.6479 | 22.3972 | -6.6489 |
| 22 | | 3.1106 | 0.2609 | $G_{23}$ | | | |
| 31 | Third Lens | 4.9131 | 0.3521 | $T_3$ | 1.5459 | 56.1138 | 10.6669 |
| 32 | | 30.6367 | 0.4083 | $G_{34}$ | | | |
| 41 | Fourth Lens | -2.0985 | 0.4477 | $T_4$ | 1.5459 | 56.1138 | 3.8055 |
| 42 | | -1.1226 | 0.1378 | $G_{45}$ | | | |
| 51 | Fifth Lens | 150.0000 | 0.3410 | $T_5$ | 1.6479 | 22.3972 | -44.9577 |
| 52 | | 24.3697 | 0.3020 | $G_{56}$ | | | |
| 61 | Sixth Lens | 48.6710 | 0.3328 | $T_6$ | 1.5459 | 56.1138 | -2.8669 |
| 62 | | 1.5127 | 0.5000 | | | | |
| 70 | IR Filter | 1.00E+18 | 0.2100 | | 1.5183 | 64.1664 | |
| | IR Filter-Image Plane | 1.00E+18 | 0.1642 | | | | |
| 71 | Image Plane | 1.00E+18 | 0.0284 | | | | |

FIG. 32

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | -2.817598E-03 | -8.064238E-02 | -1.930807E-01 | -1.194260E-01 | -1.256780E-01 | -6.854092E-02 |
| a6 | 7.845440E-02 | 6.830601E-02 | 3.411039E-01 | 1.803198E-01 | -7.516437E-02 | 1.038479E-01 |
| a8 | -2.422588E-01 | 1.618319E-01 | -2.197797E-01 | 4.917712E-01 | 1.869235E-01 | -9.483900E-01 |
| a10 | 4.528735E-01 | -4.417705E-01 | 4.624723E-02 | -2.055049E+00 | -5.433742E-01 | 2.613963E+00 |
| a12 | -3.639007E-01 | 3.672583E-01 | -2.750283E-01 | 3.635232E+00 | 7.206751E-01 | -4.379370E+00 |
| a14 | 8.781200E-02 | -2.129770E-01 | 1.834723E-01 | -3.408218E+00 | -2.713209E-01 | 4.416108E+00 |
| a16 | 0.000000E+00 | 0.000000E+00 | 0.000000E+00 | 1.385430E+00 | 0.000000E+00 | -2.384231E+00 |
| a18 | 0.000000E+00 | 0.000000E+00 | 0.000000E+00 | 0.000000E+00 | 0.000000E+00 | 5.510143E-01 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -9.819836E-01 | 0.000000E+00 | 0.000000E+00 | 0.000000E+00 | -9.847888E-01 |
| a4 | 8.336427E-02 | 1.355157E-01 | -1.496101E-01 | -1.137453E+00 | -4.215596E+00 | -3.079699E-01 |
| a6 | -2.004036E-01 | -3.780566E-01 | 3.314923E-01 | 5.656744E+00 | -2.523261E+00 | 1.849210E-01 |
| a8 | 6.540090E-01 | 1.378500E+00 | -5.609419E-01 | -3.540146E+01 | 7.687352E+01 | -8.855339E-02 |
| a10 | -1.191590E+00 | -2.744942E+00 | 4.920853E-01 | 1.106514E+02 | -2.973534E+02 | 3.406202E-02 |
| a12 | 1.126305E+00 | 3.305892E+00 | -2.360914E-01 | -1.876870E+02 | 6.374871E+02 | -1.028701E-02 |
| a14 | -5.314243E-01 | -2.408152E+00 | 5.853212E-02 | 1.763953E+02 | -8.556912E+02 | 2.231330E-03 |
| a16 | 9.905395E-02 | 1.032011E+00 | -5.980793E-03 | -8.571971E+01 | 7.111890E+02 | -3.139237E-04 |
| a18 | 0.000000E+00 | -2.396824E-01 | 5.226616E-05 | 1.669542E+01 | -3.335881E+02 | 2.513722E-05 |
| a20 | 0.000000E+00 | 2.329096E-02 | 0.000000E+00 | 0.000000E+00 | 6.729853E+01 | -8.607057E-07 |

FIG. 33

| Fifth Example ||||||
|---|---|---|---|---|---|
| EFL= 3.5755 mm, HFOV= 39.3578 deg., Fno= 2.0920 ||||||
| No. | | Curvature Radius | Ape. Stop Distance Lens Thickness Air Gap | Refractive Index | Abbe No. | Focal Length |
| | Object | 1.00E+18 | 10000 | | | |
| 80 | Ape. Stop | 1.00E+18 | -0.2851 | | | |
| 11 | First Lens | 1.4394 | 0.5341 $T_1$ | 1.5459 | 56.1138 | 3.1705 |
| 12 | | 7.4281 | 0.1116 $G_{12}$ | | | |
| 21 | Second Lens | 10.4341 | 0.2281 $T_2$ | 1.6479 | 22.3972 | -6.4413 |
| 22 | | 2.9554 | 0.3086 $G_{23}$ | | | |
| 31 | Third Lens | 5.9644 | 0.3625 $T_3$ | 1.5459 | 56.1138 | 10.4554 |
| 32 | | -129.8867 | 0.4268 $G_{34}$ | | | |
| 41 | Fourth Lens | -2.0832 | 0.4430 $T_4$ | 1.5459 | 56.1138 | 3.8469 |
| 42 | | -1.1244 | 0.0390 $G_{45}$ | | | |
| 51 | Fifth Lens | 18.5643 | 0.3909 $T_5$ | 1.6479 | 22.3972 | -87.7845 |
| 52 | | 13.8801 | 0.0877 $G_{56}$ | | | |
| 61 | Sixth Lens | 10.2236 | 0.3924 $T_6$ | 1.5459 | 56.1138 | -2.9807 |
| 62 | | 1.3848 | 0.5000 | | | |
| 70 | IR Filter | 1.00E+18 | 0.2100 | 1.5183 | 64.1664 | |
| | IR Filter-Image Plane | 1.00E+18 | 0.3513 | | | |
| 71 | Image Plane | 1.00E+18 | 0.0090 | | | |

FIG. 34

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 6.949484E-04 | -7.163424E-02 | -1.881740E-01 | -1.215070E-01 | -1.107701E-01 | -6.530548E-02 |
| a6 | 3.523960E-02 | 5.503244E-02 | 3.285426E-01 | 2.340164E-01 | -8.994691E-02 | -5.593122E-02 |
| a8 | -6.093943E-02 | 2.519833E-01 | -2.216425E-01 | 2.070747E-01 | 2.380264E-01 | -1.042694E-01 |
| a10 | 4.946037E-02 | -8.650613E-01 | -1.512717E-01 | -1.461607E+00 | -5.240713E-01 | 3.284242E-01 |
| a12 | 5.500777E-02 | 1.094190E+00 | 2.984930E-01 | 2.971441E+00 | 5.398153E-01 | -5.882899E-01 |
| a14 | -7.250724E-02 | -5.908970E-01 | -1.950612E-01 | -2.942601E+00 | -1.519649E-01 | 6.341675E-01 |
| a16 | 0.000000E+00 | 0.000000E+00 | 0.000000E+00 | 1.216563E+00 | 0.000000E+00 | -3.301881E-01 |
| a18 | 0.000000E+00 | 0.000000E+00 | 0.000000E+00 | 0.000000E+00 | 0.000000E+00 | 8.061974E-02 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -1.004338E+00 | 0.000000E+00 | 0.000000E+00 | 0.000000E+00 | -9.899563E-01 |
| a4 | 6.342978E-02 | 6.499155E-02 | -1.912849E-01 | -1.190249E+00 | -3.745707E+00 | -3.402878E-01 |
| a6 | -3.318315E-02 | 1.342688E-01 | 4.710826E-01 | 6.594755E+00 | -1.045207E+01 | 2.183558E-01 |
| a8 | 4.853872E-02 | -7.325256E-02 | -8.559783E-01 | -4.167808E+01 | 1.282048E+02 | -1.112515E-01 |
| a10 | -1.580430E-01 | -5.358121E-01 | 8.181520E-01 | 1.318895E+02 | -4.758552E+02 | 4.410759E-02 |
| a12 | 2.169854E-01 | 1.285108E+00 | -4.350862E-01 | -2.279882E+02 | 1.007708E+03 | -1.364367E-02 |
| a14 | -1.278443E-01 | -1.257146E+00 | 1.253098E-01 | 2.196051E+02 | -1.328308E+03 | 3.106368E-03 |
| a16 | 2.736819E-02 | 6.304629E-01 | -1.718180E-02 | -1.101647E+02 | 1.076377E+03 | -4.708561E-04 |
| a18 | 0.000000E+00 | -1.607580E-01 | 7.414443E-04 | 2.237653E+01 | -4.907582E+02 | 4.123210E-05 |
| a20 | 0.000000E+00 | 1.656444E-02 | 0.000000E+00 | 0.000000E+00 | 9.629521E+01 | -1.552978E-06 |

FIG. 35

| Sixth Example |||||||
|---|---|---|---|---|---|---|
| EFL= 3.5295 mm, HFOV= 39.7222 deg., Fno= 2.0920 |||||||
| No. | | Curvature Radius | Ape. Stop Distance Lens Thickness Air Gap | | Refractive Index | Abbe No. | Focal Length |
| | Object | 1.00E+18 | 10000 | | | | |
| 80 | Ape. Stop | 1.00E+18 | -0.2772 | | | | |
| 11 | First Lens | 1.4353 | 0.5670 | $T_1$ | 1.5459 | 56.1138 | 3.1831 |
| 12 | | 7.0967 | 0.0960 | $G_{12}$ | | | |
| 21 | Second Lens | 10.7858 | 0.2382 | $T_2$ | 1.6479 | 22.3972 | -6.4132 |
| 22 | | 2.9735 | 0.2740 | $G_{23}$ | | | |
| 31 | Third Lens | 5.0294 | 0.3648 | $T_3$ | 1.5459 | 56.1138 | 9.5236 |
| 32 | | 150.0000 | 0.4148 | $G_{34}$ | | | |
| 41 | Fourth Lens | -2.0137 | 0.4586 | $T_4$ | 1.5459 | 56.1138 | 3.9661 |
| 42 | | -1.1273 | 0.0407 | $G_{45}$ | | | |
| 51 | Fifth Lens | 19.8206 | 0.3842 | $T_5$ | 1.6479 | 22.3972 | -71.3563 |
| 52 | | 13.7672 | 0.0916 | $G_{56}$ | | | |
| 61 | Sixth Lens | 10.3884 | 0.4426 | $T_6$ | 1.5459 | 56.1138 | -2.9753 |
| 62 | | 1.3835 | 0.5000 | | | | |
| 70 | IR Filter | 1.00E+18 | 0.2100 | | 1.5183 | 64.1664 | |
| | IR Filter-Image Plane | 1.00E+18 | 0.2871 | | | | |
| 71 | Image Plane | 1.00E+18 | 0.0016 | | | | |

FIG. 36

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 3.500596E-03 | -8.698142E-02 | -1.927070E-01 | -1.217306E-01 | -1.152112E-01 | -6.470335E-02 |
| a6 | 1.289240E-02 | 1.270040E-01 | 3.644966E-01 | 2.314486E-01 | -9.124172E-02 | -9.323589E-03 |
| a8 | 8.242492E-03 | 3.567174E-02 | -2.708355E-01 | 2.638216E-01 | 2.275965E-01 | -3.657260E-01 |
| a10 | -5.750769E-02 | -4.456014E-01 | -1.435341E-01 | -1.655188E+00 | -4.793160E-01 | 1.032765E+00 |
| a12 | 1.267019E-01 | 6.370889E-01 | 3.198051E-01 | 3.263613E+00 | 4.689899E-01 | -1.715198E+00 |
| a14 | -8.590696E-02 | -4.106863E-01 | -2.259058E-01 | -3.169547E+00 | -1.117515E-01 | 1.720634E+00 |
| a16 | 0.000000E+00 | 0.000000E+00 | 0.000000E+00 | 1.292789E+00 | 0.000000E+00 | -9.133445E-01 |
| a18 | 0.000000E+00 | 0.000000E+00 | 0.000000E+00 | 0.000000E+00 | 0.000000E+00 | 2.167745E-01 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -1.000069E+00 | 0.000000E+00 | 0.000000E+00 | 0.000000E+00 | -9.896783E-01 |
| a4 | 8.341878E-02 | 7.897136E-02 | -1.660216E-01 | -1.152132E+00 | -4.083251E+00 | -3.422184E-01 |
| a6 | -1.228880E-01 | 6.519924E-02 | 3.815584E-01 | 5.862971E+00 | -4.416758E+00 | 2.373730E-01 |
| a8 | 2.739120E-01 | 8.265642E-03 | -6.714682E-01 | -3.668250E+01 | 8.633998E+01 | -1.361234E-01 |
| a10 | -4.838276E-01 | -4.460558E-01 | 6.249039E-01 | 1.143297E+02 | -3.180422E+02 | 6.077067E-02 |
| a12 | 4.936940E-01 | 9.830892E-01 | -3.240406E-01 | -1.935712E+02 | 6.494116E+02 | -2.001791E-02 |
| a14 | -2.556387E-01 | -9.486248E-01 | 9.055191E-02 | 1.817925E+02 | -8.242030E+02 | 4.534720E-03 |
| a16 | 5.181219E-02 | 4.717392E-01 | -1.187381E-02 | -8.840381E+01 | 6.456716E+02 | -6.545269E-04 |
| a18 | 0.000000E+00 | -1.190081E-01 | 4.649631E-04 | 1.726821E+01 | -2.858116E+02 | 5.359322E-05 |
| a20 | 0.000000E+00 | 1.208850E-02 | 0.000000E+00 | 0.000000E+00 | 5.460294E+01 | -1.881463E-06 |

FIG. 37

| Seventh Example ||||||
|---|---|---|---|---|---|
| EFL= 3.5621 mm, HFOV= 39.4636 deg., Fno= 2.0920 ||||||
| No. | | Curvature Radius | Ape. Stop Distance Lens Thickness Air Gap | Refractive Index | Abbe No. | Focal Length |
| | Object | 1.00E+18 | 10000 | | | |
| 80 | Ape. Stop | 1.00E+18 | -0.2860 | | | |
| 11 | First Lens | 1.4272 | 0.5373 | $T_1$ | 1.5459 | 56.1138 | 3.2352 |
| 12 | | 6.4470 | 0.0931 | $G_{12}$ | | | |
| 21 | Second Lens | 11.9666 | 0.2200 | $T_2$ | 1.6479 | 22.3972 | -6.7229 |
| 22 | | 3.1703 | 0.2687 | $G_{23}$ | | | |
| 31 | Third Lens | 5.4278 | 0.4180 | $T_3$ | 1.5459 | 56.1138 | 10.3051 |
| 32 | | 150.0000 | 0.4190 | $G_{34}$ | | | |
| 41 | Fourth Lens | -2.0452 | 0.4229 | $T_4$ | 1.5459 | 56.1138 | 3.8851 |
| 42 | | -1.1172 | 0.0416 | $G_{45}$ | | | |
| 51 | Fifth Lens | 18.2886 | 0.2993 | $T_5$ | 1.6479 | 22.3972 | -75.2940 |
| 52 | | 13.2162 | 0.1795 | $G_{56}$ | | | |
| 61 | Sixth Lens | 11.7489 | 0.4073 | $T_6$ | 1.5459 | 56.1138 | -2.9400 |
| 62 | | 1.3948 | 0.5000 | | | | |
| 70 | IR Filter | 1.00E+18 | 0.2100 | | 1.5183 | 64.1664 | |
| | IR Filter-Image Plane | 1.00E+18 | 0.3236 | | | | |
| 71 | Image Plane | 1.00E+18 | 0.0114 | | | | |

FIG. 38

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 3.170261E-03 | -8.367036E-02 | -1.971122E-01 | -1.229458E-01 | -1.166013E-01 | -5.700821E-02 |
| a6 | 1.186924E-02 | 9.471485E-02 | 3.938468E-01 | 1.988210E-01 | -1.136653E-01 | -4.994114E-02 |
| a8 | 3.984291E-02 | 1.039357E-01 | -3.958401E-01 | 4.464681E-01 | 3.246477E-01 | -2.557190E-01 |
| a10 | -1.635376E-01 | -4.551031E-01 | 2.378948E-01 | -2.163154E+00 | -7.150554E-01 | 8.760936E-01 |
| a12 | 2.773969E-01 | 5.312954E-01 | -2.205416E-01 | 4.072066E+00 | 7.572651E-01 | -1.657939E+00 |
| a14 | -1.631861E-01 | -3.428232E-01 | 4.456257E-02 | -3.879137E+00 | -2.365345E-01 | 1.836141E+00 |
| a16 | 0.000000E+00 | 0.000000E+00 | 0.000000E+00 | 1.565729E+00 | 0.000000E+00 | -1.047360E+00 |
| a18 | 0.000000E+00 | 0.000000E+00 | 0.000000E+00 | 0.000000E+00 | 0.000000E+00 | 2.586381E-01 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -1.019081E+00 | 0.000000E+00 | 0.000000E+00 | 0.000000E+00 | -9.918914E-01 |
| a4 | 6.793239E-02 | 8.010493E-02 | -1.634373E-01 | -1.177545E+00 | -4.452815E+00 | -3.599346E-01 |
| a6 | -7.857596E-02 | 3.126056E-02 | 3.899705E-01 | 6.650620E+00 | 2.301468E+00 | 2.663316E-01 |
| a8 | 1.694455E-01 | 1.972697E-01 | -6.976278E-01 | -4.163660E+01 | 3.733325E+01 | -1.692587E-01 |
| a10 | -3.375672E-01 | -9.145769E-01 | 6.538076E-01 | 1.300619E+02 | -1.290445E+02 | 8.326637E-02 |
| a12 | 3.483726E-01 | 1.658357E+00 | -3.402306E-01 | -2.212926E+02 | 2.251559E+02 | -2.941311E-02 |
| a14 | -1.711126E-01 | -1.531077E+00 | 9.566402E-02 | 2.087285E+02 | -2.520473E+02 | 6.994382E-03 |
| a16 | 3.211352E-02 | 7.650103E-01 | -1.286590E-02 | -1.015741E+02 | 1.896647E+02 | -1.048463E-03 |
| a18 | 0.000000E+00 | -1.982554E-01 | 5.698137E-04 | 1.970253E+01 | -8.837744E+01 | 8.881297E-05 |
| a20 | 0.000000E+00 | 2.095464E-02 | 0.000000E+00 | 0.000000E+00 | 1.893770E+01 | -3.223629E-06 |

FIG. 39

| Eighth Example ||||||
|---|---|---|---|---|---|
| EFL= 3.5304 mm, HFOV= 39.7146 deg., Fno= 2.0920 ||||||
| No. | | Curvature Radius | Ape. Stop Distance Lens Thickness Air Gap | Refractive Index | Abbe No. | Focal Length |
| | Object | 1.00E+18 | 10000 | | | |
| 80 | Ape. Stop | 1.00E+18 | -0.2777 | | | |
| 11 | First Lens | 1.4334 | 0.5403 $T_1$ | 1.5459 | 56.1138 | 3.2212 |
| 12 | | 6.7200 | 0.1010 $G_{12}$ | | | |
| 21 | Second Lens | 11.7837 | 0.2414 $T_2$ | 1.6479 | 22.3972 | -6.6786 |
| 22 | | 3.1394 | 0.2734 $G_{23}$ | | | |
| 31 | Third Lens | 5.1610 | 0.3714 $T_3$ | 1.5459 | 56.1138 | 10.0915 |
| 32 | | 79.5767 | 0.4183 $G_{34}$ | | | |
| 41 | Fourth Lens | -2.0219 | 0.4263 $T_4$ | 1.5459 | 56.1138 | 3.9279 |
| 42 | | -1.1182 | 0.0767 $G_{45}$ | | | |
| 51 | Fifth Lens | 26.5288 | 0.3747 $T_5$ | 1.6479 | 22.3972 | -91.4629 |
| 52 | | 18.2233 | 0.0929 $G_{56}$ | | | |
| 61 | Sixth Lens | 11.3420 | 0.4167 $T_6$ | 1.5459 | 56.1138 | -2.9444 |
| 62 | | 1.3896 | 0.5000 | | | |
| 70 | IR Filter | 1.00E+18 | 0.2100 | 1.5183 | 64.1664 | |
| | IR Filter-Image Plane | 1.00E+18 | 0.3006 | | | |
| 71 | Image Plane | 1.00E+18 | 0.0010 | | | |

FIG. 40

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 3.547700E-03 | -8.645746E-02 | -1.900083E-01 | -1.210674E-01 | -1.155841E-01 | -6.032362E-02 |
| a6 | 1.196012E-02 | 1.295532E-01 | 3.596123E-01 | 2.165854E-01 | -1.237207E-01 | -3.417585E-02 |
| a8 | 1.806185E-02 | -4.100550E-02 | -3.318821E-01 | 3.034061E-01 | 3.481349E-01 | -2.664958E-01 |
| a10 | -8.585543E-02 | -1.725726E-01 | 1.488076E-01 | -1.687426E+00 | -7.126097E-01 | 7.474744E-01 |
| a12 | 1.696646E-01 | 2.669252E-01 | -1.364506E-01 | 3.271326E+00 | 7.130281E-01 | -1.191576E+00 |
| a14 | -1.106252E-01 | -2.354008E-01 | 1.425721E-02 | -3.197748E+00 | -2.114935E-01 | 1.140131E+00 |
| a16 | 0.000000E+00 | 0.000000E+00 | 0.000000E+00 | 1.321607E+00 | 0.000000E+00 | -5.606062E-01 |
| a18 | 0.000000E+00 | 0.000000E+00 | 0.000000E+00 | 0.000000E+00 | 0.000000E+00 | 1.279762E-01 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -9.964834E-01 | 0.000000E+00 | 0.000000E+00 | 0.000000E+00 | -9.922909E-01 |
| a4 | 7.425940E-02 | 7.414562E-02 | -1.059288E+00 | -1.229933E+00 | -4.382477E+00 | -3.483317E-01 |
| a6 | -6.740729E-02 | 7.168030E-02 | 6.120279E+00 | 7.211808E+00 | 1.052671E+00 | 2.469164E-01 |
| a8 | 1.259562E-01 | 2.926380E-02 | -2.705548E+01 | -4.476241E+01 | 4.561496E+01 | -1.460597E-01 |
| a10 | -2.527316E-01 | -5.485265E-01 | 6.246255E+01 | 1.386004E+02 | -1.564251E+02 | 6.730602E-02 |
| a12 | 2.715495E-01 | 1.179505E+00 | -7.900171E+01 | -2.340542E+02 | 2.724609E+02 | -2.276421E-02 |
| a14 | -1.409467E-01 | -1.148356E+00 | 5.194262E+01 | 2.199318E+02 | -2.904175E+02 | 5.262123E-03 |
| a16 | 2.812929E-02 | 5.834432E-01 | -1.437586E+01 | -1.073827E+02 | 1.938607E+02 | -7.712191E-04 |
| a18 | 0.000000E+00 | -1.514554E-01 | 4.881870E-01 | 2.113664E+01 | -7.541341E+01 | 6.390349E-05 |
| a20 | 0.000000E+00 | 1.591811E-02 | 0.000000E+00 | 0.000000E+00 | 1.311956E+01 | -2.265270E-06 |

FIG. 41

| Ninth Example ||||||
|---|---|---|---|---|---|
| EFL= 3.5604 mm, HFOV= 39.4768 deg., Fno= 2.0920 ||||||
| No. | Curvature Radius | Ape. Stop Distance Lens Thickness Air Gap | | Refractive Index | Abbe No. | Focal Length |
| | Object | 1.00E+18 | 10000 | | | |
| 80 | Ape. Stop | 1.00E+18 | -0.2871 | | | |
| 11 | First Lens | 1.4184 | 0.5311 | $T_1$ | 1.5459 | 56.1138 | 3.2917 |
| 12 | | 5.8409 | 0.1072 | $G_{12}$ | | | |
| 21 | Second Lens | 11.3943 | 0.2775 | $T_2$ | 1.6479 | 22.3972 | -6.3826 |
| 22 | | 3.0051 | 0.1775 | $G_{23}$ | | | |
| 31 | Third Lens | 5.2781 | 0.4261 | $T_3$ | 1.5459 | 56.1138 | 8.6833 |
| 32 | | -45.2157 | 0.4080 | $G_{34}$ | | | |
| 41 | Fourth Lens | -2.0017 | 0.4306 | $T_4$ | 1.5459 | 56.1138 | 3.9630 |
| 42 | | -1.1187 | 0.0300 | $G_{45}$ | | | |
| 51 | Fifth Lens | 32.3568 | 0.3771 | $T_5$ | 1.6479 | 22.3972 | -84.9395 |
| 52 | | 20.2830 | 0.1471 | $G_{56}$ | | | |
| 61 | Sixth Lens | 17.8052 | 0.4009 | $T_6$ | 1.5459 | 56.1138 | -3.0012 |
| 62 | | 1.4885 | 0.5000 | | | | |
| 70 | IR Filter | 1.00E+18 | 0.2100 | | 1.5183 | 64.1664 | |
| | IR Filter- Image Plane | 1.00E+18 | 0.3478 | | | | |
| 71 | Image Plane | 1.00E+18 | 0.0072 | | | | |

FIG. 42

| No. | 11 | 12 | 21 | 22 | 31 | 32 |
|---|---|---|---|---|---|---|
| K | 0.000000E+00 | 0.000000E+00 | 0.000000E+00 | 0.000000E+00 | 0.000000E+00 | 0.000000E+00 |
| a4 | 1.409068E-03 | -9.111755E-02 | -1.902482E-01 | -1.175106E-01 | -1.252963E-01 | -7.014343E-02 |
| a6 | 1.053124E-02 | 1.494390E-01 | 4.268142E-01 | 1.248777E-01 | -8.751700E-02 | 1.176090E-01 |
| a8 | 4.766121E-02 | -1.308494E-01 | -6.602287E-01 | 8.475834E-01 | 3.036162E-01 | -9.191421E-01 |
| a10 | -1.703416E-01 | 4.615390E-02 | 8.759357E-01 | -3.370327E+00 | -7.478050E-01 | 2.417280E+00 |
| a12 | 2.727010E-01 | -1.064187E-02 | -9.426754E-01 | 6.131360E+00 | 8.349211E-01 | -3.895002E+00 |
| a14 | -1.577153E-01 | -9.912417E-02 | 3.648305E-01 | -5.710949E+00 | -2.794479E-01 | 3.799623E+00 |
| a16 | 0.000000E+00 | 0.000000E+00 | 0.000000E+00 | 2.207147E+00 | 0.000000E+00 | -2.005610E+00 |
| a18 | 0.000000E+00 | 0.000000E+00 | 0.000000E+00 | 0.000000E+00 | 0.000000E+00 | 4.625966E-01 |
| a20 | 0.000000E+00 | 0.000000E+00 | 0.000000E+00 | 0.000000E+00 | 0.000000E+00 | 0.000000E+00 |
| No. | 41 | 42 | 51 | 52 | 61 | 62 |
| K | 0.000000E+00 | -1.021483E+00 | 0.000000E+00 | 0.000000E+00 | 0.000000E+00 | -1.010268E+00 |
| a4 | 8.037368E-02 | 8.624747E-02 | -1.551682E-01 | -1.051971E+00 | -4.131491E+00 | -3.307934E-01 |
| a6 | -1.237997E-01 | 2.528261E-03 | 3.389625E-01 | 4.164701E+00 | -3.394137E+00 | 2.244437E-01 |
| a8 | 3.861202E-01 | 2.234518E-01 | -5.967732E-01 | -2.520897E+01 | 8.153291E+01 | -1.272976E-01 |
| a10 | -8.009642E-01 | -7.867454E-01 | 5.434502E-01 | 7.511119E+01 | -3.193409E+02 | 5.621033E-02 |
| a12 | 8.398243E-01 | 1.252612E+00 | -2.708979E-01 | -1.173872E+02 | 7.161441E+02 | -1.826068E-02 |
| a14 | -4.285412E-01 | -1.030423E+00 | 7.069104E-02 | 9.675066E+01 | -1.026330E+03 | 4.066885E-03 |
| a16 | 8.478058E-02 | 4.525804E-01 | -8.120944E-03 | -3.767684E+01 | 9.188558E+02 | -5.755443E-04 |
| a18 | 0.000000E+00 | -1.005831E-01 | 2.083777E-04 | 4.762720E+00 | -4.644069E+02 | 4.609990E-05 |
| a20 | 0.000000E+00 | 8.802139E-03 | 0.000000E+00 | 0.000000E+00 | 1.005430E+02 | -1.580308E-06 |

FIG. 43

| Example | First | Second | Third | Fourth | Fifth | Sixth | Seventh | Eighth | Ninth |
|---|---|---|---|---|---|---|---|---|---|
| EFL | 3.447 | 3.549 | 3.525 | 3.464 | 3.576 | 3.529 | 3.562 | 3.530 | 3.560 |
| $T_1$ | 0.506 | 0.565 | 0.512 | 0.482 | 0.534 | 0.567 | 0.537 | 0.540 | 0.531 |
| $G_1$ | 0.095 | 0.101 | 0.099 | 0.100 | 0.112 | 0.096 | 0.093 | 0.101 | 0.107 |
| $T_2$ | 0.251 | 0.267 | 0.243 | 0.220 | 0.228 | 0.238 | 0.220 | 0.241 | 0.278 |
| $G_2$ | 0.267 | 0.286 | 0.267 | 0.261 | 0.309 | 0.274 | 0.269 | 0.273 | 0.178 |
| $T_3$ | 0.417 | 0.315 | 0.365 | 0.352 | 0.362 | 0.365 | 0.418 | 0.371 | 0.426 |
| $G_3$ | 0.411 | 0.431 | 0.390 | 0.408 | 0.427 | 0.415 | 0.419 | 0.418 | 0.408 |
| $T_4$ | 0.386 | 0.431 | 0.440 | 0.448 | 0.443 | 0.459 | 0.423 | 0.426 | 0.431 |
| $G_4$ | 0.069 | 0.030 | 0.043 | 0.138 | 0.039 | 0.041 | 0.042 | 0.077 | 0.030 |
| $T_5$ | 0.364 | 0.379 | 0.281 | 0.341 | 0.391 | 0.384 | 0.299 | 0.375 | 0.377 |
| $G_5$ | 0.200 | 0.170 | 0.390 | 0.302 | 0.088 | 0.092 | 0.180 | 0.093 | 0.147 |
| $T_6$ | 0.371 | 0.428 | 0.300 | 0.333 | 0.392 | 0.443 | 0.407 | 0.417 | 0.401 |
| $G_6$ | 0.500 | 0.500 | 0.500 | 0.500 | 0.500 | 0.500 | 0.500 | 0.500 | 0.500 |
| TF | 0.210 | 0.210 | 0.210 | 0.210 | 0.210 | 0.210 | 0.210 | 0.210 | 0.210 |
| GFP | 0.205 | 0.234 | 0.241 | 0.164 | 0.351 | 0.287 | 0.324 | 0.301 | 0.348 |
| TTL | 4.256 | 4.353 | 4.290 | 4.287 | 4.395 | 4.371 | 4.352 | 4.345 | 4.378 |
| BFL | 0.915 | 0.944 | 0.951 | 0.874 | 1.061 | 0.997 | 1.034 | 1.011 | 1.058 |
| AAG | 1.042 | 1.019 | 1.189 | 1.209 | 0.974 | 0.917 | 1.002 | 0.962 | 0.870 |
| ALT | 2.295 | 2.385 | 2.141 | 2.176 | 2.351 | 2.455 | 2.305 | 2.371 | 2.443 |
| $(T_3+G_4)/G_3 \leq 1.20$ | 1.182 | 0.800 | 1.046 | 1.200 | 0.941 | 0.978 | 1.097 | 1.071 | 1.118 |
| $0.70 \leq T_3/G_5 \leq 5.40$ | 2.090 | 1.858 | 0.935 | 1.166 | 4.132 | 3.982 | 2.328 | 4.000 | 2.897 |
| $1.00 \leq G_3/G_5 \leq 5.50$ | 2.060 | 2.543 | 1.000 | 1.352 | 4.865 | 4.528 | 2.334 | 4.505 | 2.774 |
| $0.9 \leq G_3/(G_4+G_5) \leq 3.8$ | 1.530 | 2.161 | 0.900 | 0.928 | 3.368 | 3.135 | 1.895 | 2.467 | 2.304 |
| $5.50 \leq ALT/T_3$ | 5.500 | 7.571 | 5.868 | 6.180 | 6.486 | 6.731 | 5.514 | 6.383 | 5.734 |
| $1.80 \leq ALT/AAG$ | 2.202 | 2.342 | 1.800 | 1.800 | 2.414 | 2.677 | 2.300 | 2.464 | 2.809 |
| $10.20 \leq TTL/T_3$ | 10.200 | 13.818 | 11.760 | 12.176 | 12.125 | 11.982 | 10.411 | 11.698 | 10.275 |
| $0.5 \leq T_2/(G_4+G_5) \leq 1.8$ | 0.932 | 1.337 | 0.560 | 0.500 | 1.800 | 1.800 | 0.995 | 1.424 | 1.567 |
| $10 \leq TTL/G_5 \leq 50.1$ | 21.314 | 25.670 | 11.000 | 14.196 | 50.100 | 47.711 | 24.238 | 46.792 | 29.768 |
| $2 \leq BFL/G_5 \leq 12.3$ | 4.581 | 5.569 | 2.439 | 2.895 | 12.098 | 10.883 | 5.757 | 10.884 | 7.192 |
| $5 \leq ALT/G_5 \leq 26.8$ | 11.493 | 14.065 | 5.489 | 7.205 | 26.800 | 26.800 | 12.837 | 25.533 | 16.612 |
| $3 \leq AAG/G_5 \leq 11.1$ | 5.220 | 6.006 | 3.049 | 4.003 | 11.100 | 10.011 | 5.580 | 10.364 | 5.914 |
| $0.5 \leq T_2/G_5 \leq 2.6$ | 1.255 | 1.574 | 0.623 | 0.728 | 2.600 | 2.600 | 1.225 | 2.600 | 1.887 |
| $T_3/G_2 \leq 2.6$ | 1.561 | 1.100 | 1.364 | 1.350 | 1.174 | 1.331 | 1.555 | 1.358 | 2.400 |
| $G_3/T_5 \leq 1.4$ | 1.129 | 1.138 | 1.388 | 1.197 | 1.092 | 1.080 | 1.400 | 1.116 | 1.082 |
| $T_3/T_2 \leq 1.9$ | 1.665 | 1.180 | 1.502 | 1.600 | 1.589 | 1.531 | 1.900 | 1.538 | 1.535 |
| $AAG/T_4 \leq 2.70$ | 2.700 | 2.361 | 2.700 | 2.700 | 2.198 | 2.000 | 2.369 | 2.258 | 2.020 |
| $2.50 \leq BFL/T_3$ | 2.192 | 2.998 | 2.607 | 2.483 | 2.928 | 2.733 | 2.473 | 2.721 | 2.483 |
| $5.6 \leq (G_4+ALT)/G_3$ | 5.747 | 5.600 | 5.600 | 5.667 | 5.600 | 6.017 | 5.600 | 5.851 | 6.063 |

FIG. 44

OPTICAL IMAGING LENS AND ELECTRONIC DEVICE COMPRISING THE SAME

CROSS REFERENCE TO RELATED APPLICATION

This application claims priority from China Application No. 201610278223.3, filed on Apr. 29, 2016, the contents of which are hereby incorporated by reference in their entirety for all purposes.

BACKGROUND OF THE INVENTION

1. Field of the Invention

The present invention generally relates to an optical imaging lens set and an electronic device include the optical imaging lens set. Specifically speaking, the present invention is directed to an optical imaging lens set for use in taking images and videos for the application of portable electronic products, such as mobile phones, cameras, tablet personal computers, in-car cameras, or personal digital assistants (PDA), and the electronic device employing the optical imaging lens set.

2. Description of the Prior Art

The specification of consumer electronics changes all the time to pursue smaller and smaller sizes so the specification of some key components in an optical imaging lens set has to keep up with it to meet consumers' demands. The most important characters of an optical imaging lens set are image quality and size.

As far as the imaging quality is concerned, the consumers are looking for better imaging quality with the development of the imaging technology. In addition to a shorter and shorter lens set, the imaging quality and the performance are needed to take into consideration. For an optical imaging lens set of six lens elements, the prior art proposes a longer distance from the object-side surface of the first lens element to the image plane. A longer distance does not favor the size reduction of mobile phones or of cameras.

SUMMARY OF THE INVENTION

In light of the above, the present invention proposes an optical imaging lens set of high image quality and short length. The optical imaging lens set of six lens elements of the present invention from an object side toward an image side in order along an optical axis has an aperture stop, a first lens element, a second lens element, a third lens element, a fourth lens element, a fifth lens element and a sixth lens element. Each lens element, i.e. the first lens element, the second lens element, the third lens element, the fourth lens element, the fifth lens element and the sixth lens element, has an object-side surface facing toward an object side as well as an image-side surface facing toward an image side. The optical imaging lens set of the present invention exclusively has the first lens element, the second lens element, the third lens element, the fourth lens element, the fifth lens element and the sixth lens element with refractive power.

In the optical imaging lens set of the present invention, the first lens element has an image-side surface of a concave part in a vicinity of the optical axis. The second lens element has an object-side surface of a concave part in a periphery region, and an image-side surface of a concave part in a vicinity of the optical axis and of a concave part in a periphery region. The third lens element has an object-side surface of a concave part in a periphery region. The fourth lens element of positive refractive power has an object-side surface of a concave part in a vicinity of the optical axis. The third lens element has a third lens element thickness $T_3$, there is an air gap $G_{34}$ between the third lens element and the fourth lens element and there is an air gap $G_{45}$ between the fourth lens element and the fifth lens element to satisfy $(T_3+G_{45})/G_{34} \leq 1.20$.

In the optical imaging lens set of the present invention, an air gap $G_{56}$ between the fifth lens element and the sixth lens element along the optical axis satisfies $0.70 \leq (T_3/G_{56}) \leq 5.40$.

In the optical imaging lens set of the present invention, the optical imaging lens set further satisfies $1.00 \leq (G_{34}/G_{56}) \leq 5.50$.

In the optical imaging lens set of the present invention, the optical imaging lens set further satisfies $0.90 \leq G_{34}/(G_{45}+G_{56}) \leq 3.80$.

In the optical imaging lens set of the present invention, ALT is the total thickness of all six lens elements to satisfy $5.50 \leq ALT/T_3$.

In the optical imaging lens set of the present invention, the sum of all air gaps AAG between each lens elements from the first lens element to the sixth lens element along the optical axis satisfies $1.80 \leq ALT/AAG$.

In the optical imaging lens set of the present invention, TTL is a distance from the first object-side surface to an image plane along the optical axis to satisfy $10.20 \leq TTL/T_3$.

In the optical imaging lens set of the present invention, a second lens element thickness $T_2$ of the second lens element satisfies $0.50 \leq T_2/(G_{45}+G_{56}) \leq 1.80$.

In the optical imaging lens set of the present invention, the optical imaging lens set further satisfies $10.00 \leq (TTL/G_{56}) \leq 50.10$.

In the optical imaging lens set of the present invention, a distance BFL between the sixth image-side surface and the image plane along the optical axis satisfies $2.00 \leq (BFL/G_{56}) \leq 12.30$.

In the optical imaging lens set of the present invention, the optical imaging lens set further satisfies $5.00 \leq (ALT/G_{56}) \leq 26.80$.

In the optical imaging lens set of the present invention, the optical imaging lens set further satisfies $3.00 \leq (AAG/G_{56}) \leq 11.10$.

In the optical imaging lens set of the present invention, the optical imaging lens set further satisfies $0.50 \leq (T_2/G_{56}) \leq 2.60$.

In the optical imaging lens set of the present invention, an air gap $G_{23}$ between the second lens element and the third lens element along the optical axis satisfies $T_3/G_{23} \leq 2.60$.

In the optical imaging lens set of the present invention, a fifth lens element thickness $T_5$ of the fifth lens element satisfies $G_{34}/T_5 \leq 1.40$.

In the optical imaging lens set of the present invention, a second lens element thickness $T_2$ of the second lens element satisfies $T_3/T_2 \leq 1.90$.

In the optical imaging lens set of the present invention, a fourth lens element thickness $T_4$ of the fourth lens element satisfies $AAG/T_4 \leq 2.70$.

In the optical imaging lens set of the present invention, the optical imaging lens set further satisfies $2.50 \leq BFL/T_3$.

In the optical imaging lens set of the present invention, the optical imaging lens set further satisfies $5.60 \leq (G_{45}+ALT)/G_{34}$.

The present invention also proposes an electronic device which includes the optical imaging lens set as described above. The electronic device of the present invention includes a case and an image module disposed in the case. The image module includes an optical imaging lens set as described above, a barrel for the installation of the optical imaging lens set, a module housing unit for the installation of the barrel, and an image sensor disposed at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or a periphery region of one lens element.

FIG. 26 shows the optical data of the first example of the optical imaging lens set.

FIG. 27 shows the aspheric surface data of the first example.

FIG. 28 shows the optical data of the second example of the optical imaging lens set.

FIG. 29 shows the aspheric surface data of the second example.

FIG. 30 shows the optical data of the third example of the optical imaging lens set.

FIG. 31 shows the aspheric surface data of the third example.

FIG. 32 shows the optical data of the fourth example of the optical imaging lens set.

FIG. 33 shows the aspheric surface data of the fourth example.

FIG. 34 shows the optical data of the fifth example of the optical imaging lens set.

FIG. 35 shows the aspheric surface data of the fifth example.

FIG. 36 shows the optical data of the sixth example of the optical imaging lens set.

FIG. 37 shows the aspheric surface data of the sixth example.

FIG. 38 shows the optical data of the seventh example of the optical imaging lens set.

FIG. 39 shows the aspheric surface data of the seventh example.

FIG. 40 shows the optical data of the eighth example of the optical imaging lens set.

FIG. 41 shows the aspheric surface data of the eighth example.

FIG. 42 shows the optical data of the ninth example of the optical imaging lens set.

FIG. 43 shows the aspheric surface data of the ninth example.

FIG. 44 shows some important ratios in the examples.

DETAILED DESCRIPTION

Figure 6:
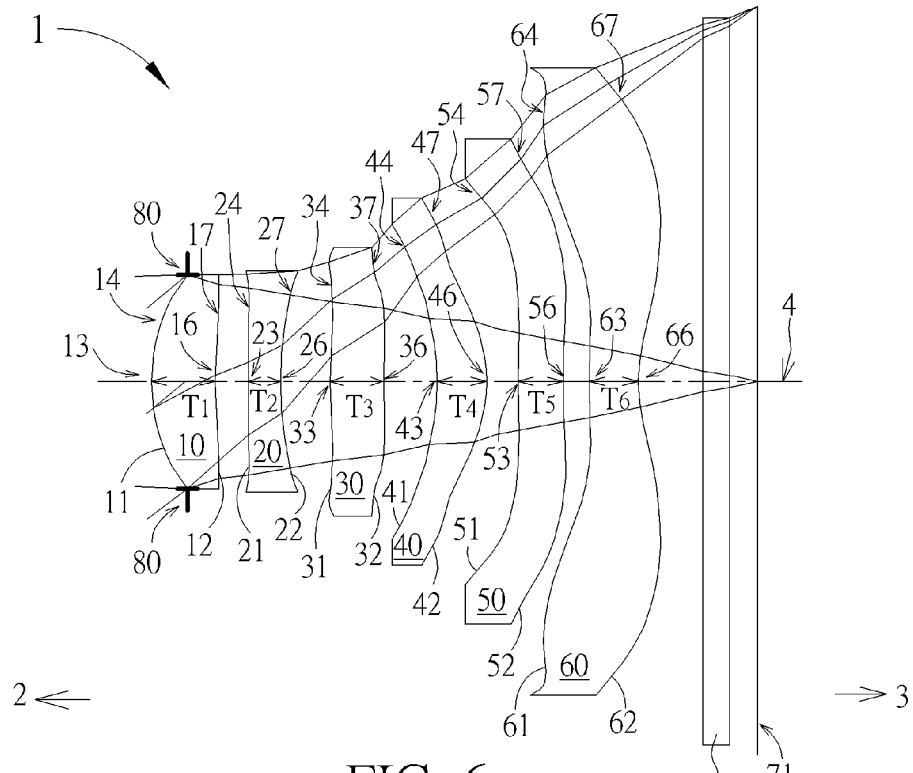
FIG. 6 illustrates a first example of the optical imaging lens set of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that near the optical axis and for light to pass through is the region in a vicinity of the optical axis, and the region C that the marginal ray passing through is the region of a certain lens element's periphery region. In addition, the lens element may include an extension part E for the lens element to be installed in an optical imaging lens set (that is the region outside the region C perpendicular to the optical axis). Ideally speaking, no light would pass through the extension part, and the actual structure and shape of the extension part is not limited to this and may have other variations. For the reason of simplicity, the extension part is not illustrated in the following examples. More, precisely, the method for determining the surface shapes or the region in a vicinity of the optical axis, a periphery region and other regions is described in the following paragraphs:

1. FIG. 1 is a radial cross-sectional view of a lens element. Before determining boundaries of those aforesaid portions, two referential points should be defined first, middle point and conversion point. The middle point of a surface of a lens element is a point of intersection of that surface and the optical axis. The conversion point is a point on a surface of a lens element, where the tangent line of that point is perpendicular to the optical axis. Additionally, if multiple conversion points appear on one single surface, then these conversion points are sequentially named along the radial direction of the surface with numbers starting from the first conversion point. For instance, the first conversion point (closest one to the optical axis), the second conversion point, and the $N^{th}$ conversion point (farthest one to the optical axis within the scope of the clear aperture of the surface). The portion of a surface of the lens element between the middle point and the first conversion point is defined as the portion in a vicinity of the optical axis. The portion located radially outside of the $N^{th}$ conversion point (but still within the scope of the clear aperture) is defined as the portion in a periphery region of the lens element. In some embodiments, there are other portions existing between the portion in a vicinity of the optical axis and the portion in a periphery region of the lens element; the numbers of portions depend on the numbers of the conversion point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the middle point and the first conversion point has a convex shape, the portion located radially outside of the first conversion point has a concave shape, and the first conversion point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none conversion point cases, the portion in a vicinity of the optical axis is defined as the portion between 0-50% of the effective radius (radius of the clear aperture) of the surface, whereas the portion in a periphery region of the lens element is defined as the portion between 50~100% of effective radius (radius of the clear aperture) of the surface.

Referring to the first example depicted in FIG. 3, only one conversion point, namely a first conversion point, appears within the clear aperture of the image-side surface of the lens element. Portion I is a portion in a vicinity of the optical axis, and portion II is a portion in a periphery region of the lens element. The portion in a vicinity of the optical axis is determined as having a concave surface due to the R value at the image-side surface of the lens element is positive. The shape of the portion in a periphery region of the lens element is different from that of the radially inner adjacent portion, i.e. the shape of the portion in a periphery region of the lens element is different from the shape of the portion in a vicinity of the optical axis; the portion in a periphery a periphery region of the lens element has a convex shape.

Referring to the second example depicted in FIG. 4, a first conversion point and a second conversion point exist on the object-side surface (within the clear aperture) of a lens element. In which portion I is the portion in a vicinity of the optical axis, and portion III is the portion in a periphery region of the lens element. The portion in a vicinity of the optical axis has a convex shape because the R value at the object-side surface of the lens element is positive. The portion in a periphery region of the lens element (portion III) has a convex shape. What is more, there is another portion having a concave shape existing between the first and second conversion point (portion II).

Referring to a third example depicted in FIG. 5, no conversion point exists on the object-side surface of the lens element. In this case, the portion between 0-50% of the effective radius (radius of the clear aperture) is determined as the portion in a vicinity of the optical axis, and the portion between 50~100% of the effective radius is determined as the portion in a periphery a periphery region of the lens element. The portion in a vicinity of the optical axis of the object-side surface of the lens element is determined as having a convex shape due to its positive R value, and the portion in a periphery region of the lens element is determined as having a convex shape as well.

As shown in FIG. 6, the optical imaging lens set 1 of six lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a fifth lens element 50, a sixth lens element 60, a filter 70 and an image plane 71. Generally speaking, the first lens element 10, the second lens element 20, the third lens element 30, the fourth lens element 40, the fifth lens element 50 and the sixth lens element 60 may be made of a transparent plastic material but the present invention is not limited to this and each lens element has an appropriate refractive power. There are exclusively six lens elements, which means the first lens element 10, the second lens element 20, the third lens element 30, the fourth lens element 40, the fifth lens element 50 and the sixth lens element 60, with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed at an appropriate position. In FIG. 6, the aperture stop 80 is disposed between the object side 2 and the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50, the sixth lens element 60 and the filter 70. In one embodiments of the present invention, the optional filter 70 may be a filter of various suitable functions, for example, the filter 70 may be an infrared cut filter (IR cut filter), placed between the image-side surface 62 of the sixth lens element 60 and the image plane 71.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part (or portion) in a periphery region (periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; the sixth lens element 60 has a sixth object-side surface 61 and a sixth image-side surface 62.

Each lens element in the optical imaging lens set 1 of the present invention further has a central thickness T on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, the fifth lens element 50 has a fifth lens element thickness $T_5$, the sixth lens element 60 has a sixth lens element thickness $T_5$. Therefore, the total thickness of all the lens elements in the optical imaging lens set 1 along the optical axis 4 is $ALT=T_1+T_2+T_3+T_4+T_5+T_6$.

In addition, between two adjacent lens elements in the optical imaging lens set 1 of the present invention there is an air gap along the optical axis 4. For example, an air gap $G_{12}$ is disposed between the first lens element 10 and the second lens element 20, an air gap $G_{23}$ is disposed between the second lens element 20 and the third lens element 30, an air gap $G_{34}$ is disposed between the third lens element 30 and the fourth lens element 40, an air gap $G_{45}$ is disposed between the fourth lens element 40 and the fifth lens element 50 as well as an air gap $G_{56}$ is disposed between the fifth lens element 50 and the sixth lens element 60. Therefore, the sum of total five air gaps between adjacent lens elements from the first lens element 10 to the sixth lens element 60 along the optical axis 4 is $AAG=G_{12}+G_{23}+G_{34}+G_{45}+G_{56}$.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the sixth image-side surface 62 of the sixth lens element 60 to the image plane 71 along the optical axis 4 is BFL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the Abbe number of the first lens element 10 is v1; the Abbe number of the second lens element 20 is v2; the Abbe number of the third lens element 30 is v3; and the Abbe number of the fourth lens element 40 is v4; the Abbe number of the fifth lens element 50 is v5; and the Abbe number of the sixth lens element 60 is v6.

First Example

Figures 7A, 7B, 7C, 7D:
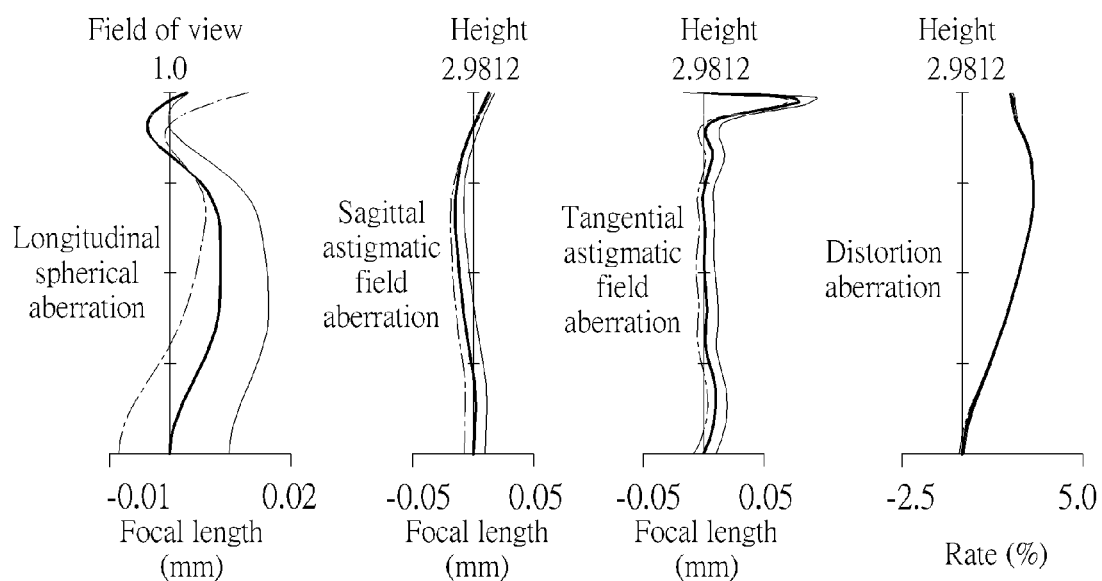
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stands for "image height", which is 2.981 mm.

The optical imaging lens set 1 of the first example has six lens elements, the first lens element 10, the second lens element 20, the third lens element 30, the fourth lens element 40, the fifth lens element 50 and the sixth lens element 60, with refractive power. The optical imaging lens set 1 also has a filter 70, an aperture stop 80, and an image plane 71. The aperture stop 80 is provided between the object side 2 and the first lens element 10. The filter 70 may be used for preventing specific wavelength light (such as the infrared light) reaching the image plane to adversely affect the imaging quality.

The first lens element 10 has positive refractive power. The first object-side surface 11 facing toward the object side 2 has a convex part 13 in the vicinity of the optical axis and a convex part 14 in a periphery region. The first image-side surface 12 facing toward the image side 3 has a concave part 16 in the vicinity of the optical axis and a convex part 17 in a periphery region. Besides, at least one of the first object-side surface 11 and the first image-side 12 of the first lens element 10 is aspherical.

The second lens element 20 has negative refractive power. The second object-side concave surface 21 facing toward the object side 2 has a convex part 23 in the vicinity of the optical axis and a concave part 24 in a periphery region. The second image-side surface 22 facing toward the image side 3 has a concave part 26 in the vicinity of the optical axis and a concave part 27 in a periphery region. At least one of the second object-side surface 21 and the second image-side 22 of the second lens element 20 is aspherical.

The third lens element 30 has positive refractive power. The third object-side surface 31 facing toward the object side 2 has a convex part 33 in the vicinity of the optical axis and a concave part 34 in a periphery region. The third image-side surface 32 facing toward the image side 3 has a concave part 36 in the vicinity of the optical axis and a concave part 37 in a periphery region. At least one of the third object-side surface 31 and the third image-side 32 of the third lens element 30 is aspherical.

The fourth lens element 40 has positive refractive power. The fourth object-side surface 41 facing toward the object side 2 has a concave part 43 in the vicinity of the optical axis and a concave part 44 in a periphery region. The fourth image-side surface 42 facing toward the image side 3 has a convex part 46 in the vicinity of the optical axis and a convex part 47 in a periphery region. At least one of the fourth object-side surface 41 and the fourth image-side 42 of the fourth lens element 40 is aspherical.

The fifth lens element 50 has negative refractive power. The fifth object-side surface 51 facing toward the object side 2 has a convex part 53 in the vicinity of the optical axis and a concave part 54 in a periphery region. The fifth image-side surface 52 facing toward the image side 3 has a concave part 56 in the vicinity of the optical axis and a convex part 57 in a periphery region. Both the fifth object-side surface 51 and the fifth image-side 52 of the fifth lens element 50 are aspherical surfaces.

The sixth lens element 60 has negative refractive power. The sixth object-side surface 61 facing toward the object side 2 has a convex part 63 in the vicinity of the optical axis and a convex part 64 in a periphery region. The sixth image-side surface 62 facing toward the image side 3 has a concave part 66 in the vicinity of the optical axis and a convex part 67 in a periphery region. Both the sixth object-side surface 61 and the sixth image-side 62 of the sixth lens element 60 are aspherical surfaces. The filter 70 may be disposed between the sixth image-side surface 62 of the sixth lens element 60 and the image plane 71.

In the first lens element 10, the second lens element 20, the third lens element 30, the fourth lens element 40, the fifth lens element 50 and the sixth lens element 60 of the optical imaging lens element 1 of the present invention, there are 12 surfaces, such as the object-side surfaces 11/21/31/41/51/61 and the image-side surfaces 12/22/32/42/52/62. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance
Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the $i^{th}$ order.

The optical data of the first example of the optical imaging lens set 1 are shown in FIG. 26 while the aspheric surface data are shown in FIG. 27. In the present examples of the optical imaging lens set, the f-number of the entire optical lens element system is Fno, EFL is the effective focal length, HFOV stands for the half field of view which is half of the field of view of the entire optical lens element system, and the unit for the curvature radius, the thickness and the focal length is in millimeters (mm). Fno is 2.0920. The image height is 2.9812 mm. HFOV is 40.3902 degrees.

The TTL of the first example of the present invention is effectively reduced and the chromatic aberration is decreased to provide better imaging quality. The demonstrated first example may maintain a good optical performance and reduced lens set length to realize a smaller product design.

Second Example

Figure 8:
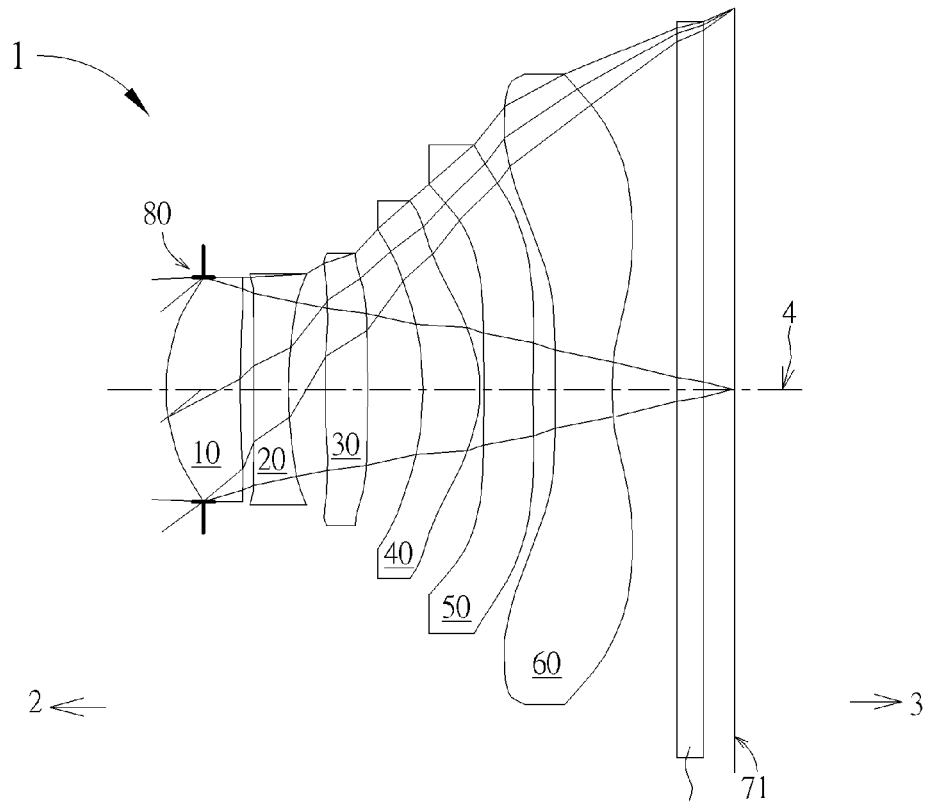
FIG. 8 illustrates a second example of the optical imaging lens set of six lens elements of the present invention.
Figures 9A, 9B, 9C, 9D:
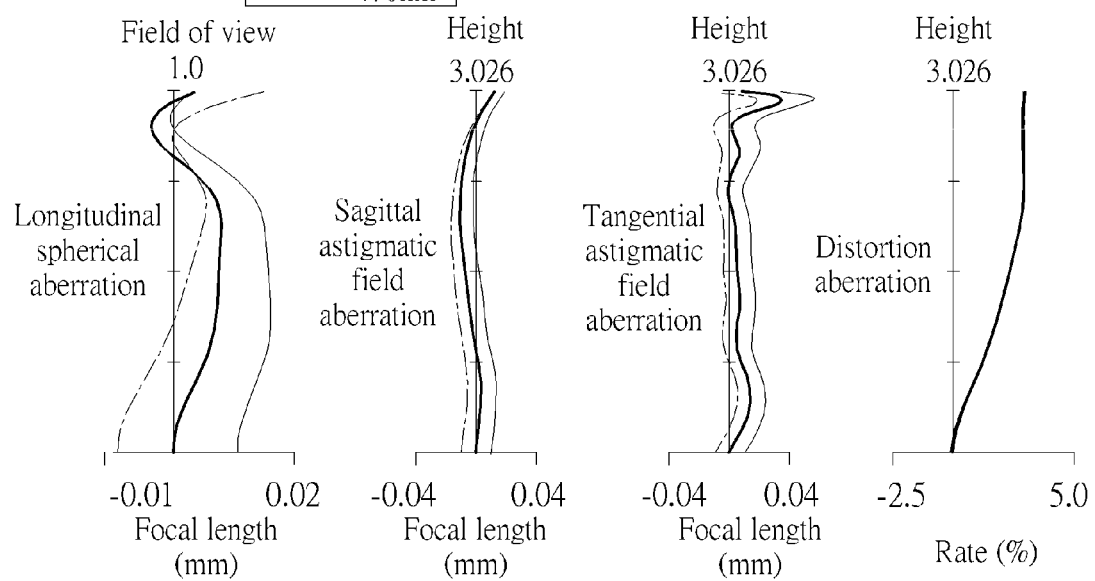
FIG. 9A illustrates the longitudinal spherical aberration on the image plane of the second example.
FIG. 9B illustrates the astigmatic aberration on the sagittal direction of the second example.
FIG. 9C illustrates the astigmatic aberration on the tangential direction of the second example.
FIG. 9D illustrates the distortion aberration of the second example.

Please refer to FIG. 8 which illustrates the second example of the optical imaging lens set 1 of the present invention. It is noted that from the second example to the following examples, in order to simplify the figures, only the components different from what the first example has, and the basic lens elements will be labeled in figures. Other components that are the same as what the first example has, such as the object-side surface, the image-side surface, the part in a vicinity of the optical axis and the part in a periphery region will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example. In particular, the second example is easier to be fabricated so the yield would be better.

The optical data of the second example of the optical imaging lens set are shown in FIG. 28 while the aspheric surface data are shown in FIG. 29. The image height is 3.026 mm. Fno is 2.0920. HFOV is 39.5648 degrees.

Third Example

Figure 10:
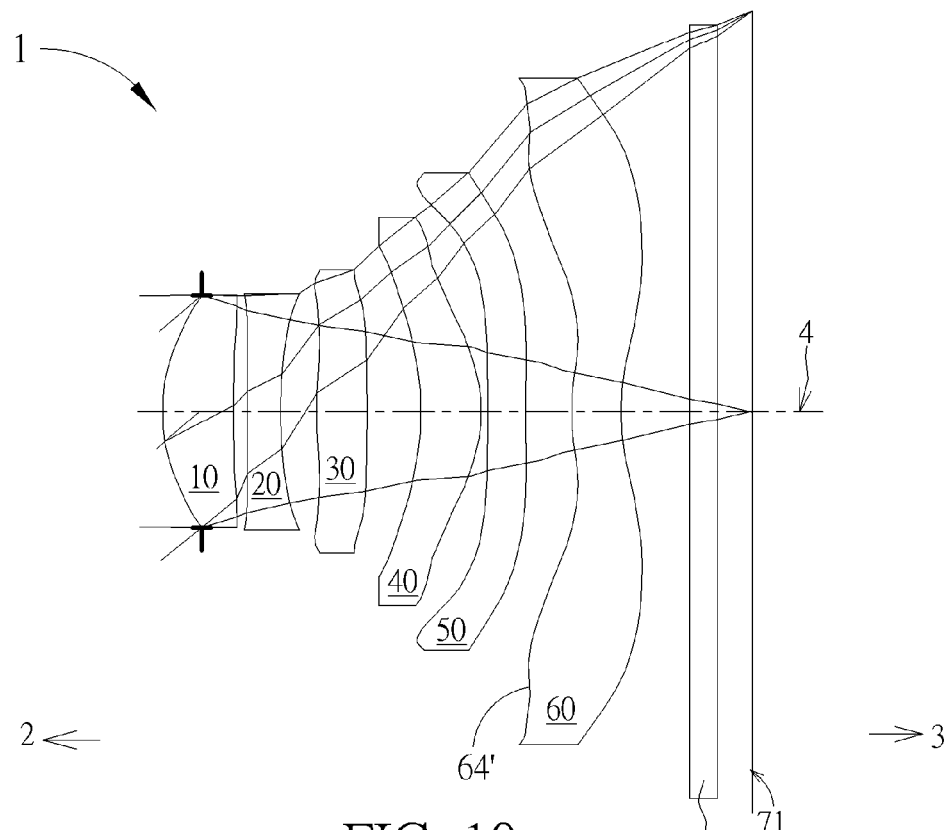
FIG. 10 illustrates a third example of the optical imaging lens set of six lens elements of the present invention.
Figures 11A, 11B, 11C, 11D:
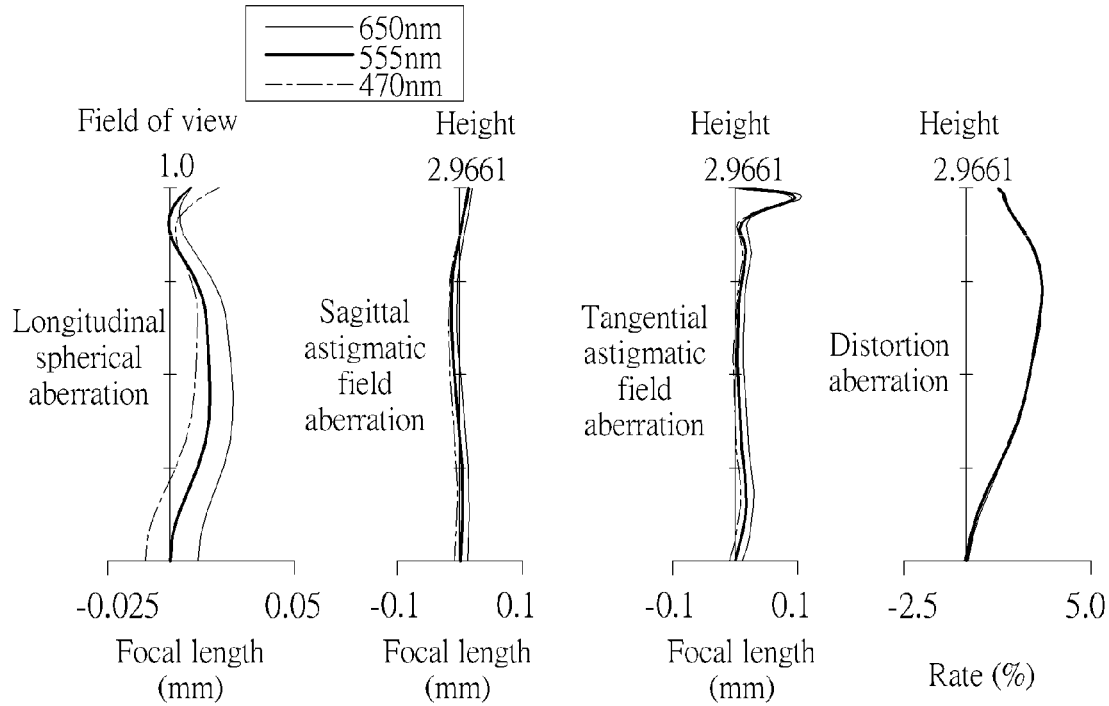
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the sixth object-side surface 61 has a concave part 64' in a periphery region. In particular, 1) the imaging quality of the third example is better than the first example. 2) The third example is easier to be fabricated than the first example so the yield would be better.

The optical data of the third example of the optical imaging lens set are shown in FIG. 30 while the aspheric surface data are shown in FIG. 31. The image height is 2.9661 mm. Fno is 2.0920. HFOV is 39.7540 degrees.

Fourth Example

Figure 12:
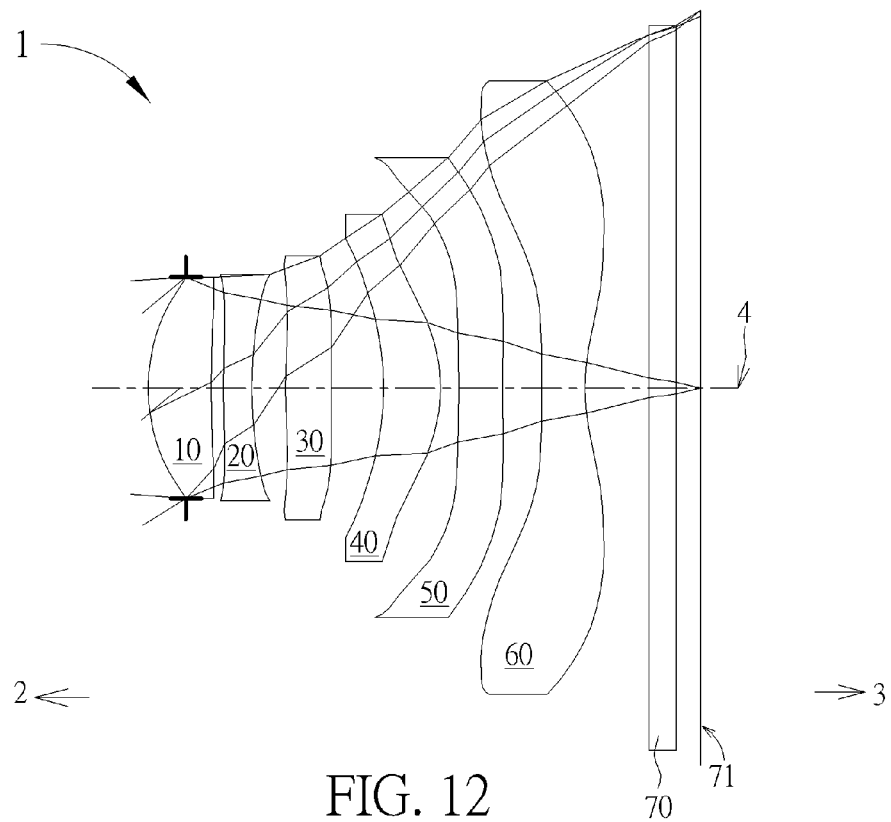
FIG. 12 illustrates a fourth example of the optical imaging lens set of six lens elements of the present invention.
Figures 13A, 13B, 13C, 13D:
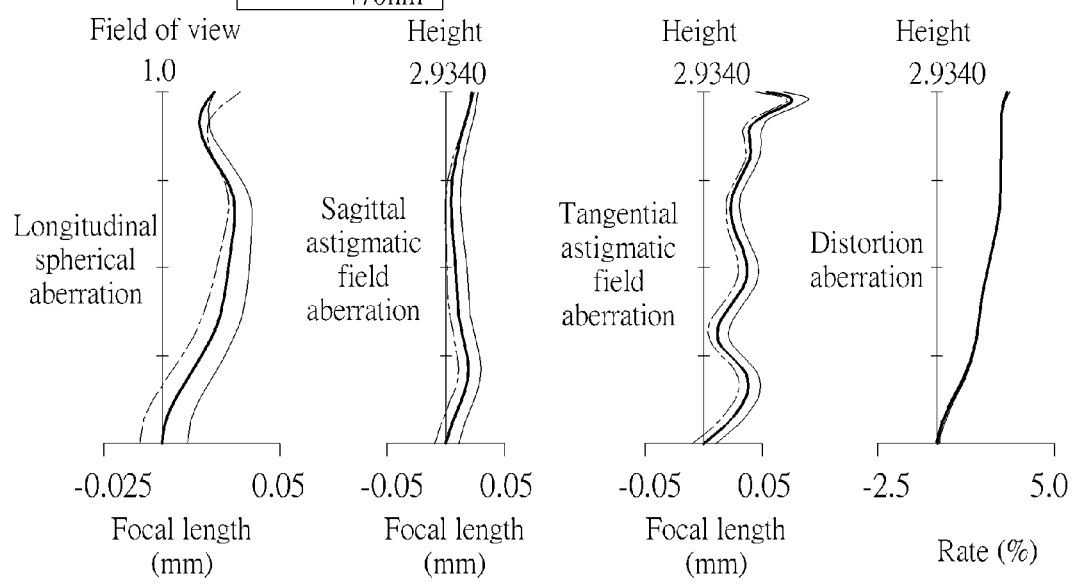
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example. In particular, 1) the imaging quality of the fourth example is better than the first example. 2) The fourth example is easier to be fabricated than the first example so the yield would be better.

The optical data of the fourth example of the optical imaging lens set are shown in FIG. 32 while the aspheric surface data are shown in FIG. 33. The image height is 2.9340 mm. Fno is 2.0920. HFOV is 39.2417 degrees.

Fifth Example

Figure 14:
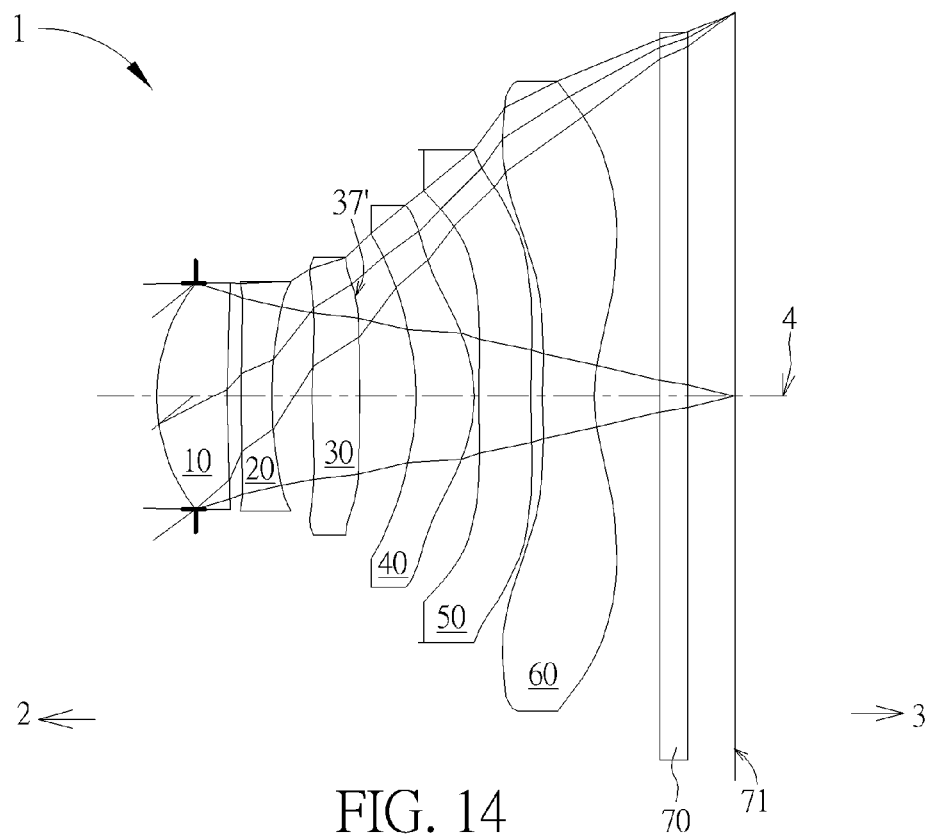
FIG. 14 illustrates a fifth example of the optical imaging lens set of six lens elements of the present invention.
Figures 15A, 15B, 15C, 15D:
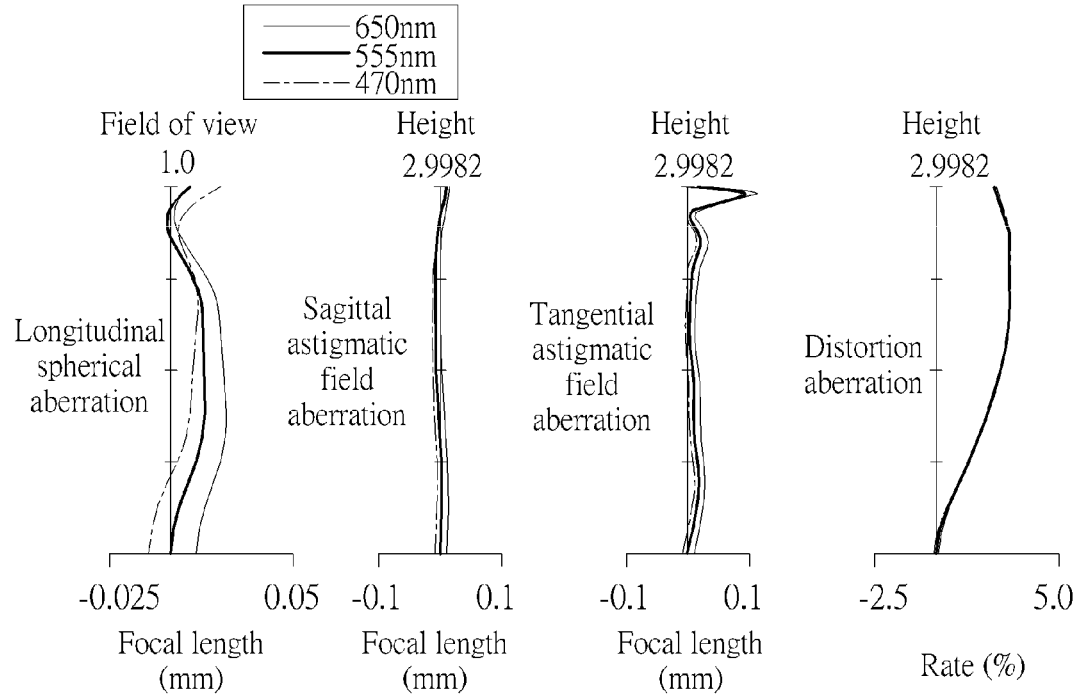
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the third image-side surface 32 has a convex part 36' in the vicinity of the optical axis. In particular, 1) the imaging quality of the fifth example is better than the first example. 2) The fifth example is easier to be fabricated than the first example so the yield would be better.

The optical data of the fifth example of the optical imaging lens set are shown in FIG. 34 while the aspheric surface data are shown in FIG. 35. The image height is 2.9982 mm. Fno is 2.0920. HFOV is 39.3578 degrees.

Sixth Example

Figure 16:
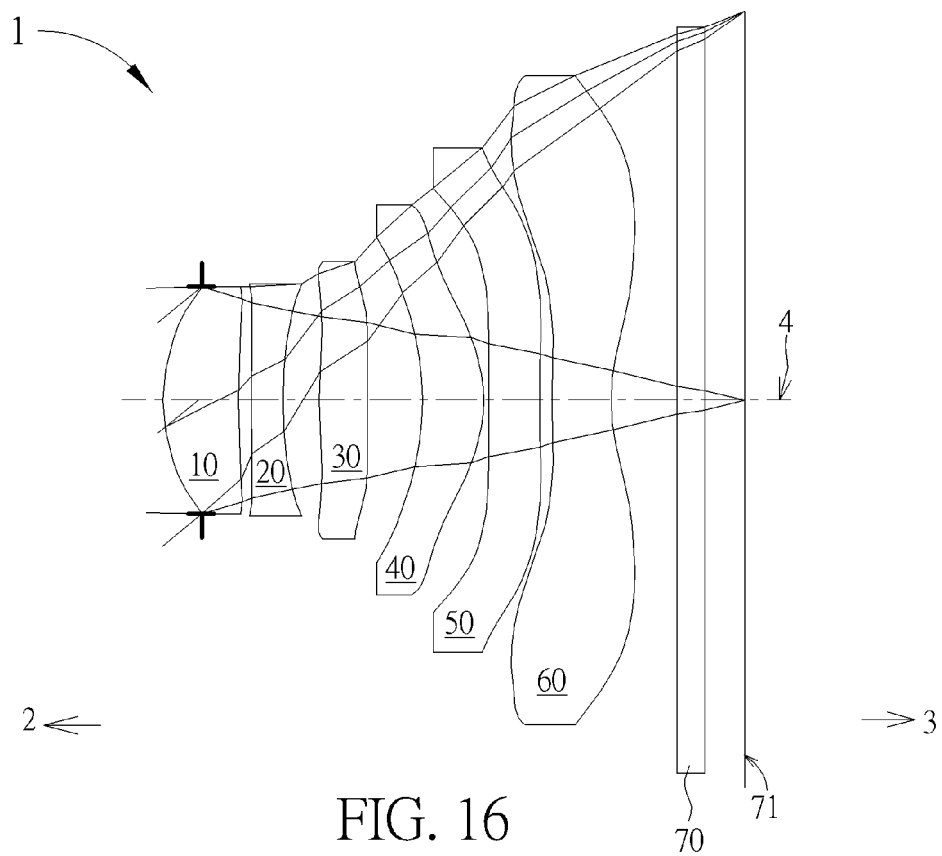
FIG. 16 illustrates a sixth example of the optical imaging lens set of six lens elements of the present invention.
Figures 17A, 17B, 17C, 17D:
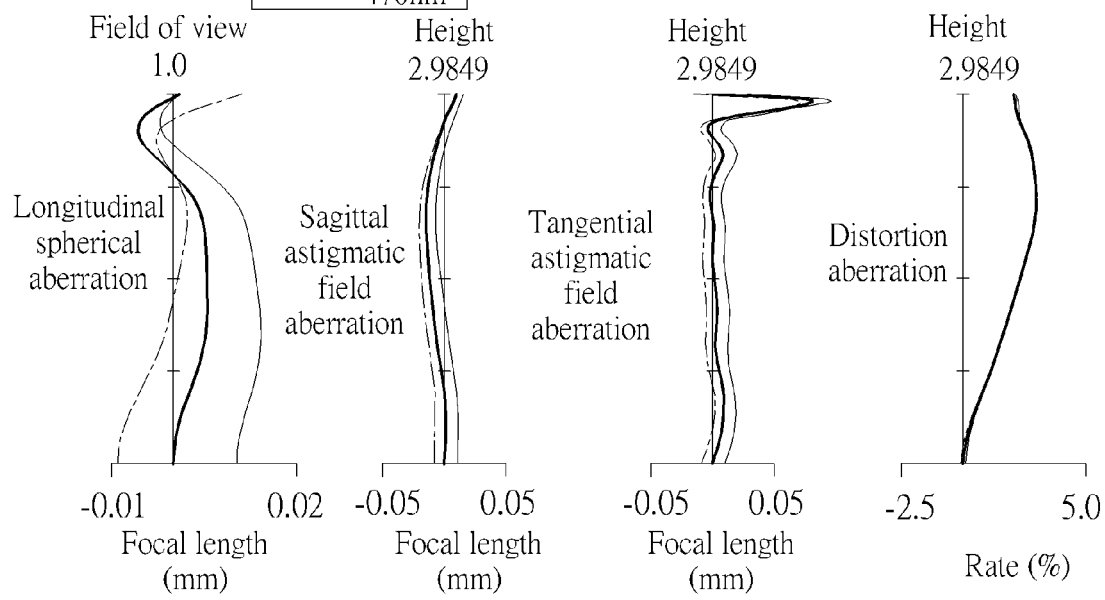
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens set 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example. In particular, the sixth example is easier to be fabricated than the first example so the yield would be better.

The optical data of the sixth example of the optical imaging lens set are shown in FIG. 36 while the aspheric surface data are shown in FIG. 37. The image height is 2.9849 mm. Fno is 2.0920. HFOV is 39.7222 degrees.

Seventh Example

Figure 18:
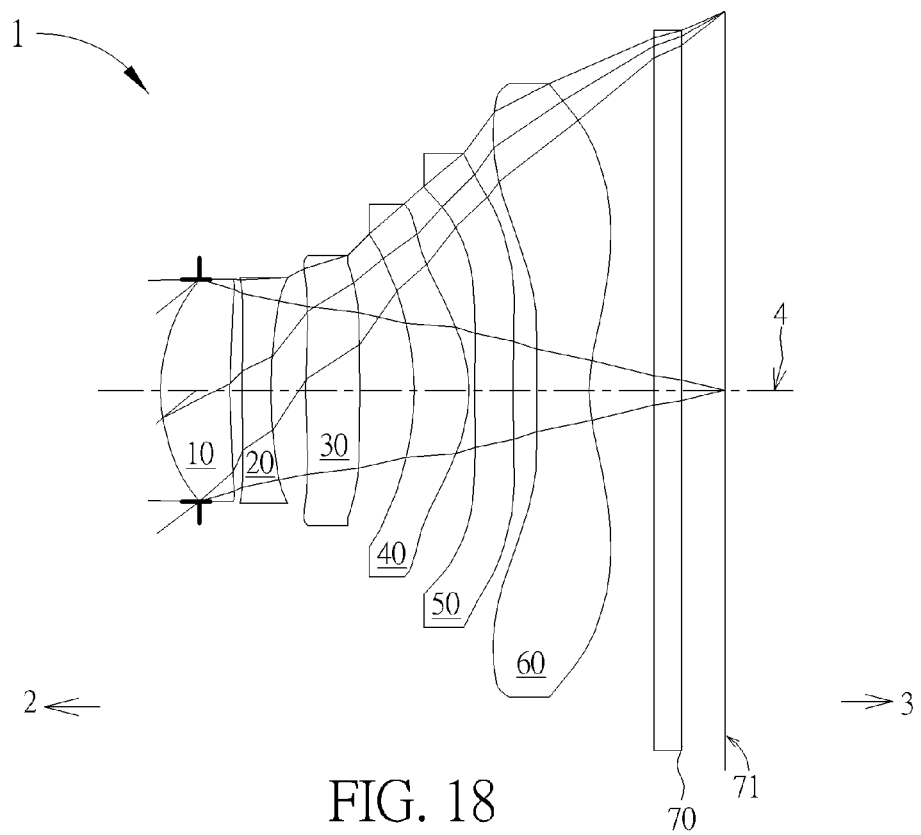
FIG. 18 illustrates a seventh example of the optical imaging lens set of six lens elements of the present invention.
Figures 19A, 19B, 19C, 19D:
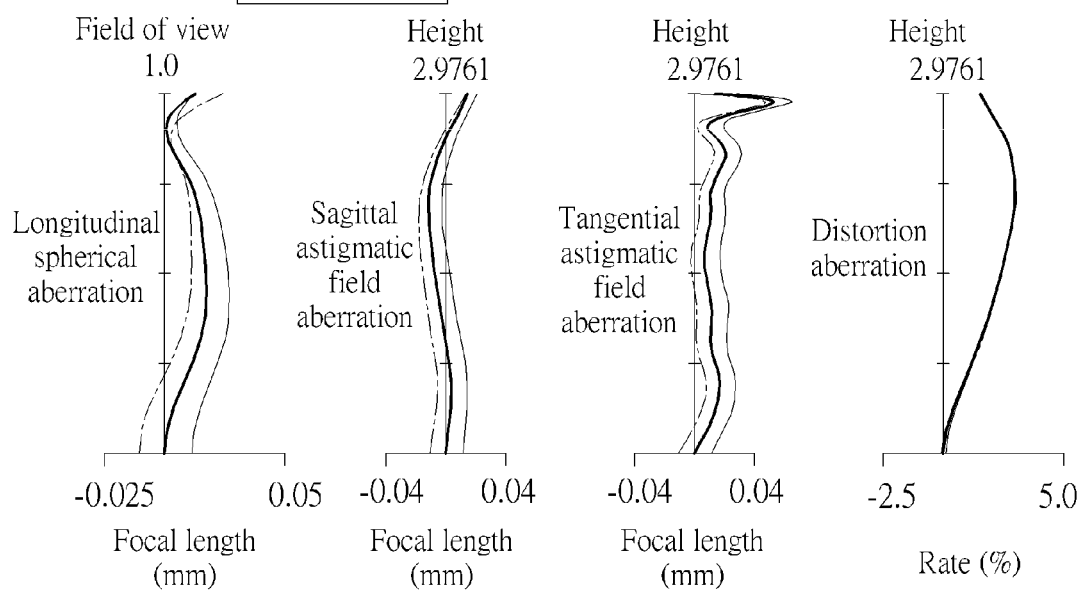
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens set 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example. In particular, 1) the imaging quality of the seventh example is better than the first example, and 2) the seventh example is easier to be fabricated than the first example so the yield would be better.

The optical data of the seventh example of the optical imaging lens set are shown in FIG. 38 while the aspheric surface data are shown in FIG. 39. The image height is 2.9761 mm. Fno is 2.0920. HFOV is 39.4636 degrees.

Eighth Example

Figure 20:
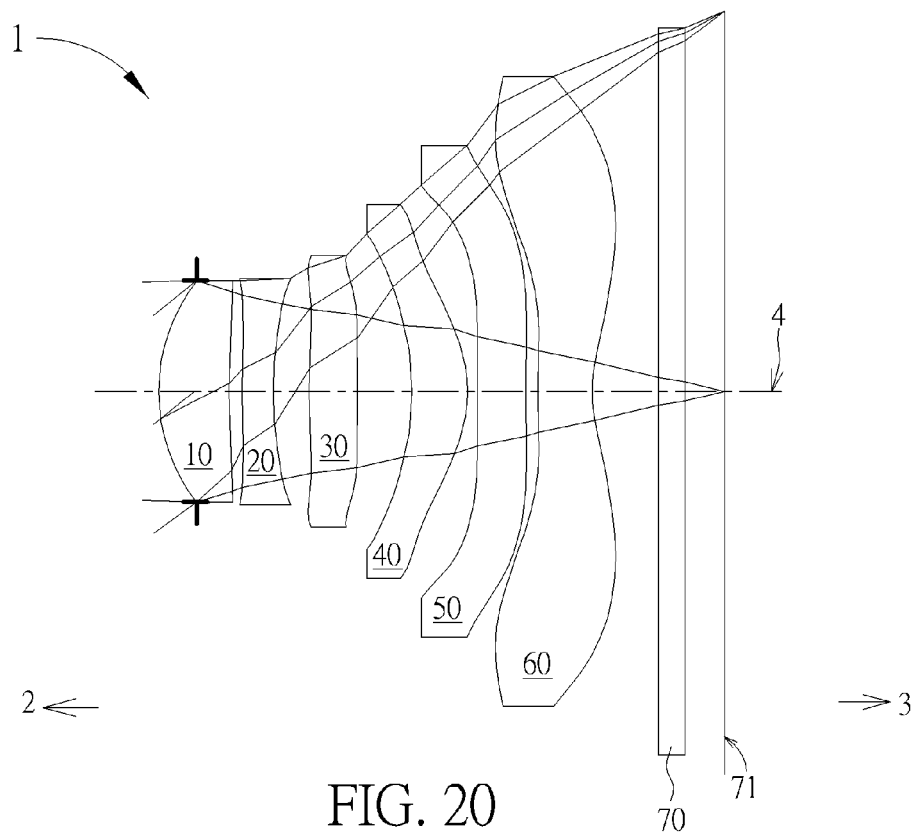
FIG. 20 illustrates an eighth example of the optical imaging lens set of six lens elements of the present invention.
Figures 21A, 21B, 21C, 21D:
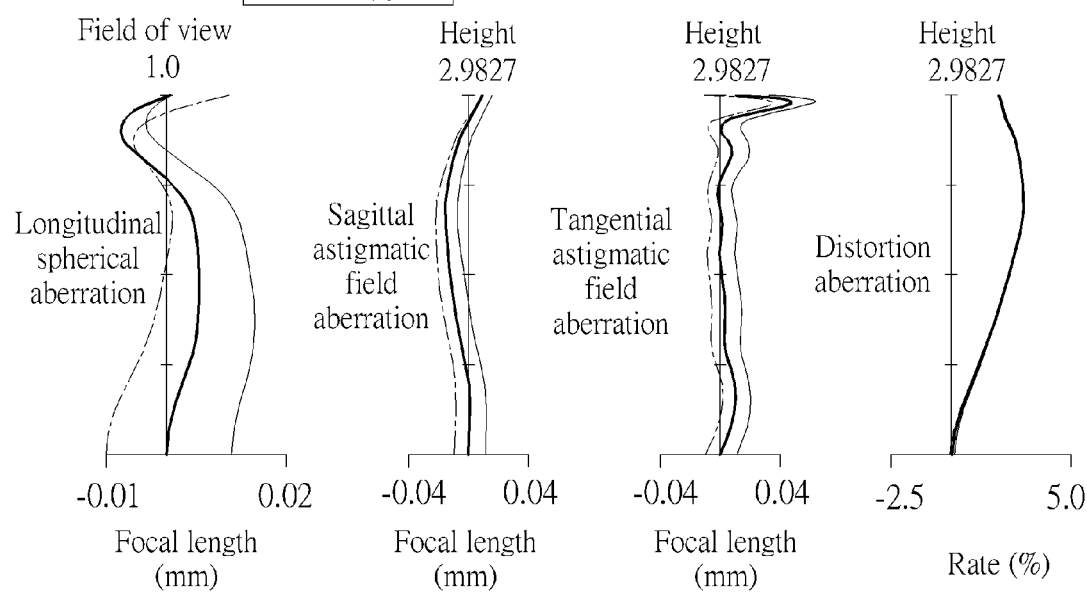
FIG. 21A illustrates the longitudinal spherical aberration on the image plane of the eighth example.
FIG. 21B illustrates the astigmatic aberration on the sagittal direction of the eighth example.
FIG. 21C illustrates the astigmatic aberration on the tangential direction of the eighth example.
FIG. 21D illustrates the distortion aberration of the eighth example.

Please refer to FIG. 20 which illustrates the eighth example of the optical imaging lens set 1 of the present invention. Please refer to FIG. 21A for the longitudinal spherical aberration on the image plane 71 of the eighth example; please refer to FIG. 21B for the astigmatic aberration on the sagittal direction; please refer to FIG. 21C for the astigmatic aberration on the tangential direction, and please refer to FIG. 21D for the distortion aberration. The components in the eighth example are similar to those in the first example, but the optical data such as the curvature radius, the refractive power, the lens thickness, the lens focal length, the aspheric surface or the back focal length in this example are different from the optical data in the first example. In particular, the eighth example is easier to be fabricated than the first example so the yield would be better.

The optical data of the eighth example of the optical imaging lens set are shown in FIG. 40 while the aspheric surface data are shown in FIG. 41. The image height is 2.9827 mm. Fno is 2.0920. HFOV is 39.7146 degrees.

Ninth Example

Figure 22:
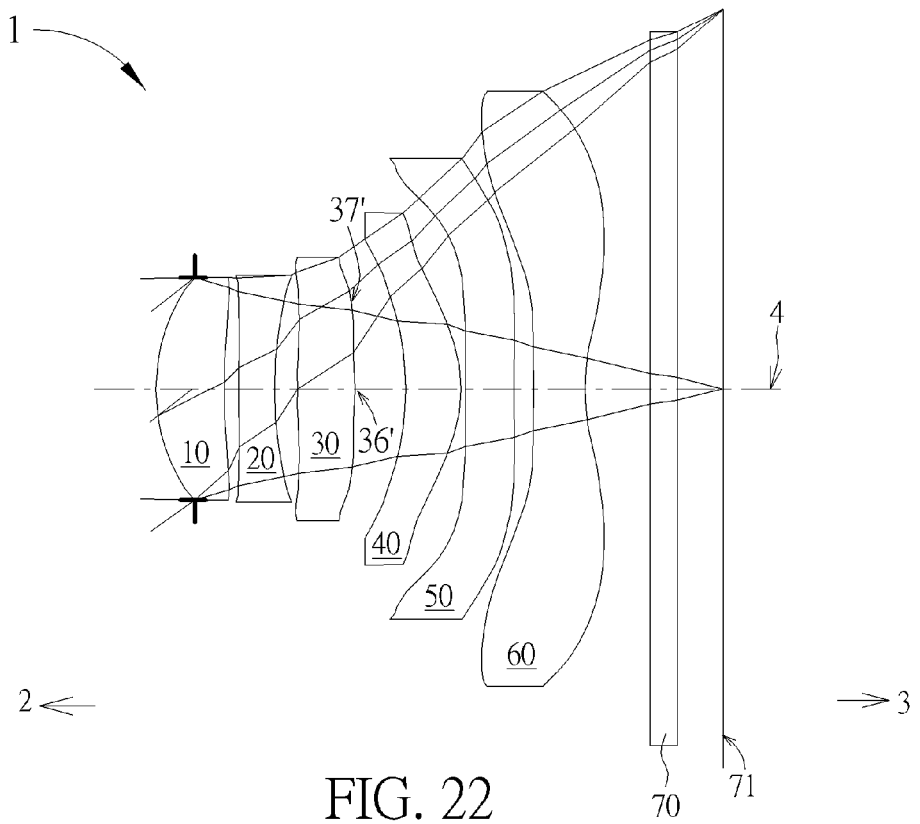
FIG. 22 illustrates a ninth example of the optical imaging lens set of six lens elements of the present invention.
Figures 23A, 23B, 23C, 23D:
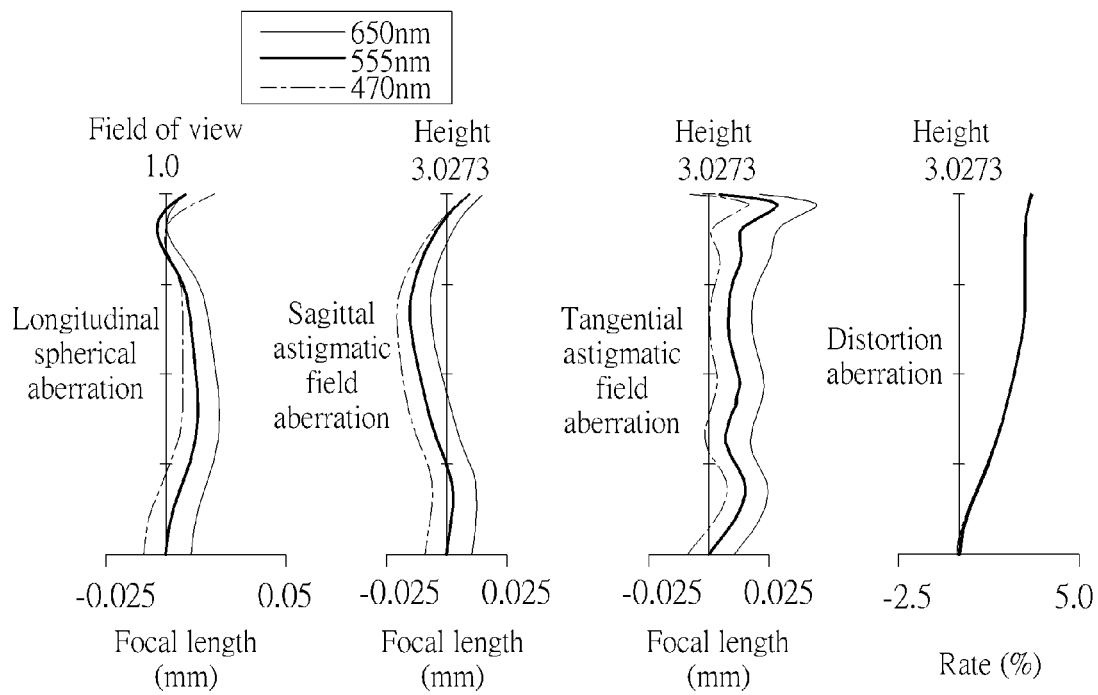
FIG. 23A illustrates the longitudinal spherical aberration on the image plane of the ninth example.
FIG. 23B illustrates the astigmatic aberration on the sagittal direction of the ninth example.
FIG. 23C illustrates the astigmatic aberration on the tangential direction of the ninth example.
FIG. 23D illustrates the distortion aberration of the ninth example.

Please refer to FIG. 22 which illustrates the ninth example of the optical imaging lens set 1 of the present invention. Please refer to FIG. 23A for the longitudinal spherical aberration on the image plane 71 of the ninth example; please refer to FIG. 23B for the astigmatic aberration on the sagittal direction; please refer to FIG. 23C for the astigmatic aberration on the tangential direction, and please refer to FIG. 23D for the distortion aberration. The components in the ninth example are similar to those in the first example, but the optical data such as the curvature radius, the refractive power, the lens thickness, the lens focal length, the aspheric surface or the back focal length in this example are different from the optical data in the first example, and in this example, the third image-side surface 32 has a convex part 36' in the vicinity of the optical axis and a convex part 37' in a periphery region. In particular, 1) the imaging quality of the ninth example is better than the first example. 2) The ninth example is easier to be fabricated than the first example so the yield would be better.

The optical data of the ninth example of the optical imaging lens set are shown in FIG. 42 while the aspheric surface data are shown in FIG. 43. The image height is 3.0273 mm. Fno is 2.0920. HFOV is 39.4768 degrees.

Some important ratios in each example are shown in FIG. 44. The distance between the sixth image-side surface 62 of the sixth lens element 60 to the filter 70 along the optical axis 4 is G6F; the thickness of the filter 70 along the optical axis 4 is TF; the distance between the filter 70 to the image plane 71 along the optical axis 4 is GFP; the distance between the sixth image-side surface 62 of the sixth lens element 60 to the image plane 71 along the optical axis 4 is BFL. Therefore, BFL=G6F+TF+GFP.

In the light of the above examples, the inventors observe at least the following features:

1. The first image-side surface of a concave part in a vicinity of the optical axis helps collect the imaging light.
2. The second object-side surface of a concave part in a periphery region, and the second image-side surface of a concave part in a vicinity of the optical axis and a concave part in a periphery region help correct the overall aberration, and further correct a local aberration.
3. The third object-side surface of a concave part in a periphery region helps correct the major aberration caused by the previous two lens elements to enhance the imaging quality.
4. The positive refractive power of the fourth lens element to go with its object-side surface of a concave part of the optical axis helps correct the aberration. The above designs to combine one with another may effectively reduce the length of the optical imaging lens set and ensure the imaging quality.

In addition, the inventors discover that there are some better ratio ranges for different data according to the above various important ratios. In order to reduce the total length, the lens thickness as well as the air gaps are appropriately reduced but one should be go with another to take the easiness of the assembly and the imaging quality into consideration. Better ratio ranges help the designers to design a better optical performance and an effectively reduce length of a practically possible optical imaging lens set.

To meet any one of the following conditions, the numerators may be smaller when denominators are kept unchanged to reduce the total length. For example:

(a) $0.70 \leq T_3/G_{56} \leq 5.40$.
(b) $1.00 \leq G_{34}/G_{56} \leq 5.50$.
(c) $0.90 \leq G_{34}/(G_{45}+G_{56}) \leq 3.80$.
(d) $0.50 \leq T_2/(G_{45}+G_{56}) \leq 1.80$.
(e) $2.00 \leq BFL/G_{56} \leq 12.30$.
(f) $5.00 \leq ALT/G_{56} \leq 26.80$.
(g) $3.00 \leq AAG/G_{56} \leq 11.10$.
(h) $0.50 \leq T_2/G_{56} \leq 2.60$.
(i) $(T_3+G_4O/G_{34} \leq 1.20$, preferably 0.7~1.2.
(j) $5.50 \leq ALT/T_3$, preferably 5.5~13.4.
(k) $1.80 \leq ALT/AAG$, preferably 1.8~4.1.
(l) $T_3/G_{23} \leq 2.60$, preferably 1.1~2.6.
(m) $G_{34}/T_5 \leq 1.40$, preferably 0.2~1.4.
(n) $T_3/T_2 \leq 1.90$, preferably 0.7~1.9.
(o) $AAG/T_4 \leq 2.70$, preferably 2~2.7.
(p) $2.50 \leq BFL/T_3$, preferably 2.5~6.1.
(q) $5.60 \leq (G_{45}+ALT)/G_{34}$, preferably 5.6~37.7.

In order to avoid parameters too small to zoom out and too large to be short enough, the following conditions keep the ratio of the system focus and lens length in a good range.

(r) $10.20 \leq TTL/T_3$, preferably 10.2~23.4.
(s) $10.00 \leq TTL/G_{56} \leq 50.10$.

In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths are pretty close to one another, which means the present invention is able to concentrate light of the three representing different wavelengths so that the aberration is greatly improved.

In the light of the unpredictability of the optical imaging lens set, the present invention suggests the above principles. The accordance of the principles preferably helps decrease the TTL, increase the aperture stop available, increase the HFOV, increase the imaging quality and increase the yield of the assembling to overcome the drawbacks of prior art. The above limitations may be properly combined at the discretion of persons who practice the present invention and they are not limited as shown above.

Figure 24:
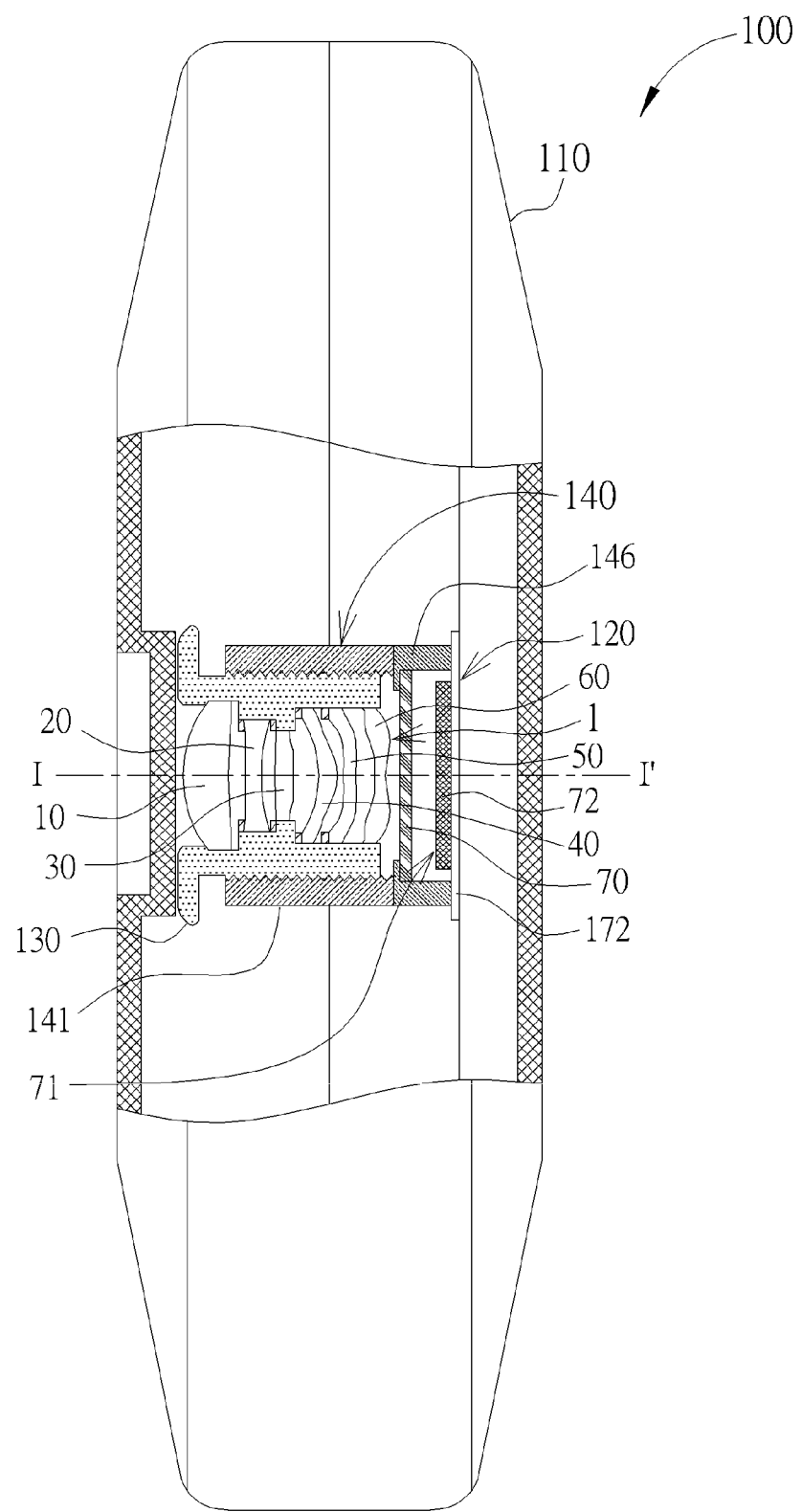
FIG. 24 illustrates a first preferred example of the portable electronic device with an optical imaging lens set of the present invention.

The optical imaging lens set 1 of the present invention may be applied to an electronic device, such as mobile phones or driving recorders. Please refer to FIG. 24. FIG. 24 illustrates a first preferred example of the optical imaging lens set 1 of the present invention for use in a portable electronic device 100. The electronic device 100 includes a case 110, and an image module 120 mounted in the case 110. A mobile phone is illustrated in FIG. 24 as an example, but the electronic device 100 is not limited to a mobile phone.

As shown in FIG. 24, the image module 120 includes the optical imaging lens set 1 as described above. FIG. 24 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 72 disposed at the substrate 172, and at the image side 3 of the optical imaging lens set 1. The image sensor 72 in the optical imaging lens set 1 may be an electronic photosensitive element, such as a charge coupled device or a complementary metal oxide semiconductor element. The image plane 71 forms at the image sensor 72.

The image sensor 72 used here is a product of chip on board (COB) package rather than a product of the conventional chip scale package (CSP) so it is directly attached to the substrate 172, and protective glass is not needed in front of the image sensor 72 in the optical imaging lens set 1, but the present invention is not limited to this.

To be noticed in particular, the optional filter 70 may be omitted in other examples although the optional filter 70 is present in this example. The case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 72. However in other examples, the image sensor housing 146 is optional. The barrel 130 is installed coaxially along with the lens element housing 141 along the axis I-I', and the barrel 130 is provided inside of the lens element housing 141.

Figure 25:
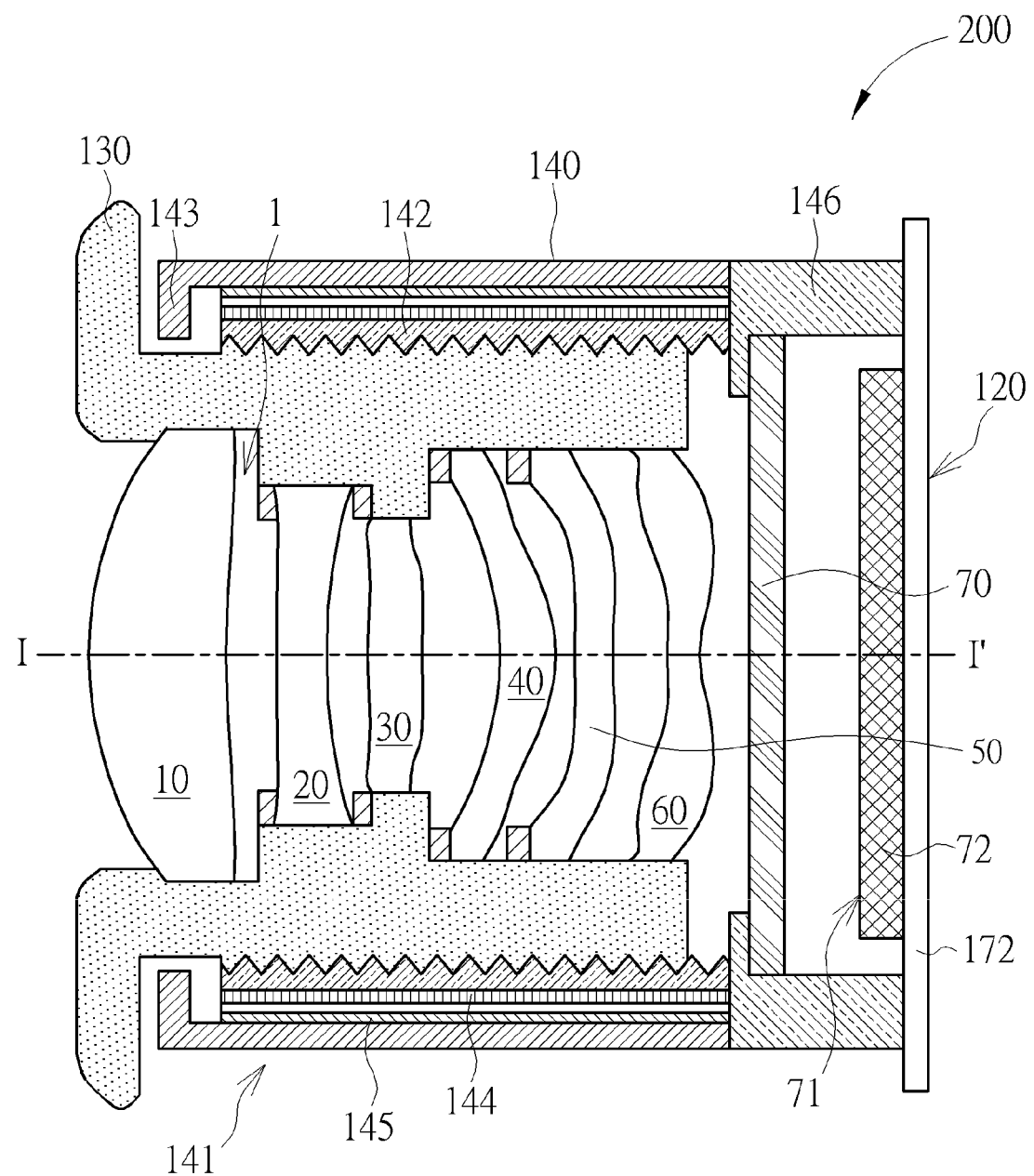
FIG. 25 illustrates a second preferred example of the portable electronic device with an optical imaging lens set of the present invention.

Please also refer to FIG. 25 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145.

The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 6. The image sensor housing 146 is attached to the second seat element 143. The filter 70, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element and a sixth lens element, said first lens element to said sixth lens element each having an object-side surface facing toward the object side as well as an image-side surface facing toward the image side, wherein:
   said first lens element has an image-side surface of a concave part in a vicinity of the optical axis;
   said second lens element has an object-side surface of a concave part in a periphery region, and an image-side surface of a concave part in a vicinity of the optical axis and of a concave part in a periphery region;
   said third lens element has an object-side surface of a concave part in a periphery region;
   said fourth lens element of positive refractive power has an object-side surface of a concave part of the optical axis, and
the optical imaging lens set exclusively has six lens elements with refractive power, said third lens element has a third lens element thickness $T_3$, there is an air gap $G_{34}$ between said third lens element and said fourth lens element and there is an air gap $G_{45}$ between said fourth lens element and said fifth lens element to satisfy $(T_3+G_{45})/G_{34} \leq 1.20$.

2. The optical imaging lens set of claim 1, wherein an air gap $G_{56}$ between said fifth lens element and said sixth lens element along said optical axis satisfies $0.70 \leq (T_3/G_{56}) \leq 5.40$.

3. The optical imaging lens set of claim 1, wherein an air gap $G_{56}$ between said fifth lens element and said sixth lens element along said optical axis satisfies $1.00 \leq (G_{34}/G_{56}) \leq 5.50$.

4. The optical imaging lens set of claim 1, wherein an air gap $G_{56}$ between said fifth lens element and said sixth lens element along said optical axis satisfies $0.90 \leq G_{34}/(G_{45}+G_{56}) \leq 3.80$.

5. The optical imaging lens set of claim 1, wherein ALT is the total thickness of all six lens elements and said third lens element has a third lens element thickness $T_3$ to satisfy $5.50 \leq ALT/T_3$.

6. The optical imaging lens set of claim 5, wherein the sum of all air gaps AAG between each lens elements from said first lens element to said sixth lens element along the optical axis satisfies $1.80 \leq ALT/AAG$.

7. The optical imaging lens set of claim 1, wherein TTL is a distance from the first object-side surface to an image plane to satisfy $10.20 \leq TTL/T_3$.

8. The optical imaging lens set of claim 7, wherein a second lens element thickness $T_2$ of said second lens element and an air gap $G_{56}$ between said fifth lens element and said sixth lens element along said optical axis satisfy $0.50 \leq T_2/(G_{45}+G_{56}) \leq 1.80$.

9. The optical imaging lens set of claim 1, wherein a distance TTL from the first object-side surface to an image plane and an air gap $G_{56}$ between said fifth lens element and said sixth lens element along said optical axis satisfy $10.00 \leq (TTL/G_{56}) \leq 50.10$.

10. The optical imaging lens set of claim 1, wherein a distance BFL between said image-side surface of said sixth lens element to an image plane along the optical axis and an air gap $G_{56}$ between said fifth lens element and said sixth lens element along said optical axis satisfy $2.00 \leq (BFL/G_{56}) \leq 12.30$.

11. The optical imaging lens set of claim 1, wherein ALT is the total thickness of all six lens elements and there is an air gap $G_{56}$ between said fifth lens element and said sixth lens element along said optical axis to satisfy $5.00 \leq (ALT/G_{56}) \leq 26.80$.

12. The optical imaging lens set of claim 1, wherein the sum of all air gaps AAG between each lens elements from said first lens element to said sixth lens element along the optical axis and an air gap $G_{56}$ between said fifth lens element and said sixth lens element along said optical axis satisfy $3.00 \leq (AAG/G_{56}) \leq 11.10$.

13. The optical imaging lens set of claim 1, wherein a second lens element thickness $T_2$ of said second lens element and an air gap $G_{56}$ between said fifth lens element and said sixth lens element along said optical axis satisfy $0.50 \leq (T_2/G_{56}) \leq 2.60$.

14. The optical imaging lens set of claim 1, wherein an air gap $G_{23}$ between said second lens element and said third lens element along said optical axis satisfy $T_3/G_{23} \leq 2.60$.

15. The optical imaging lens set of claim 14, wherein said fifth lens element has a fifth lens element thickness $T_5$ to satisfy $G_{34}/T_5 \leq 1.40$.

16. The optical imaging lens set of claim 1, wherein a second lens element thickness $T_2$ of said second lens element satisfies $T_3/T_2 \leq 1.90$.

17. The optical imaging lens set of claim 16, wherein the sum of all air gaps AAG between each lens elements from said first lens element to said sixth lens element along the optical axis and a fourth lens element thickness $T_4$ of said fourth lens element satisfy $AAG/T_4 \leq 2.70$.

18. The optical imaging lens set of claim 1, wherein a distance BFL between said image-side surface of said sixth lens element to an image plane along the optical axis satisfies $2.50 \leq BFL/T_3$.

19. The optical imaging lens set of claim 18, wherein ALT is the total thickness of all six lens elements satisfies $5.60 \leq (G_{45}+ALT)/G_{34}$.

20. An electronic device, comprising:
a case; and
an image module disposed in said case and comprising:
an optical imaging lens set of claim 1;
a barrel for the installation of said optical imaging lens set;
a module housing unit for the installation of said barrel; and
an image sensor disposed at an image side of said optical imaging lens set.

* * * * *